(12) United States Patent
Ali et al.

(10) Patent No.: US 10,371,516 B2
(45) Date of Patent: Aug. 6, 2019

(54) METHOD AND APPARATUS FOR DETERMINATION OF MISALIGNMENT BETWEEN DEVICE AND PEDESTRIAN

(71) Applicant: Trusted Positioning, Inc., Calgary (CA)

(72) Inventors: Abdelrahman Ali, Calgary (CA);
Hsiu-Wen Chang, Calgary (CA);
Jacques Georgy, Calgary (CA);
Zainab Syed, Calgary (CA);
Christopher Goodall, Calgary (CA)

(73) Assignee: InvenSense, Inc., San Jose, CA (US)

( * ) Notice: Subject to any disclaimer, the term of this patent is extended or adjusted under 35 U.S.C. 154(b) by 247 days.

(21) Appl. No.: 14/761,156

(22) PCT Filed: Jan. 21, 2014

(86) PCT No.: PCT/CA2014/000040
§ 371 (c)(1),
(2) Date: Jul. 15, 2015

(87) PCT Pub. No.: WO2014/110672
PCT Pub. Date: Jul. 24, 2014

(65) Prior Publication Data
US 2015/0354951 A1    Dec. 10, 2015

Related U.S. Application Data

(60) Provisional application No. 61/754,863, filed on Jan. 21, 2013.

(51) Int. Cl.
*G01B 21/24* (2006.01)
*G01P 15/18* (2013.01)
(Continued)

(52) U.S. Cl.
CPC ............. *G01B 21/24* (2013.01); *G01C 21/16* (2013.01); *G01P 15/18* (2013.01); *G06F 3/0346* (2013.01)

(58) Field of Classification Search
CPC ......... G01B 21/24; G01C 21/16; G01P 15/18; G06F 3/0346
(Continued)

(56) References Cited

U.S. PATENT DOCUMENTS

| 4,601,206 A * | 7/1986 | Watson | G01C 21/16 |
|---|---|---|---|
| | | | 73/510 |
| 2003/0018430 A1 * | 1/2003 | Ladetto | G01C 21/16 |
| | | | 701/472 |

(Continued)

FOREIGN PATENT DOCUMENTS

CA    2769788 A1    9/2012

OTHER PUBLICATIONS

International Search Report and Written Opinion—PCT/CA2014/000040—ISA/CA—Apr. 3, 2014.

*Primary Examiner* — Herve-Louis Y Assouman
(74) *Attorney, Agent, or Firm* — Bay Area Technology Law Group PC

(57) ABSTRACT

The present disclosure relates to a method and apparatus for determining the misalignment between a device and a pedestrian, wherein the pedestrian can carry, hold, or use the device in different orientations in a constrained or unconstrained manner, and wherein the device comprises a sensor assembly. The sensors in the device may be for example, accelerometers, gyroscopes, magnetometers, barometer among others. The sensors have a corresponding frame for the sensors' axes. The misalignment between the device and the pedestrian means the misalignment between the frame of the sensor assembly in the device and the frame of the pedestrian. The present method and apparatus can work (Continued)

Device frame whether in the presence or in the absence of absolute navigational information updates (such as, for example, Global Navigation Satellite System (GNSS) or WiFi positioning).

10 Claims, 24 Drawing Sheets

(51) Int. Cl.
　　*G01C 21/16* (2006.01)
　　*G06F 3/0346* (2013.01)
(58) Field of Classification Search
　　USPC .......................................................... 702/141
　　See application file for complete search history.

(56) References Cited

U.S. PATENT DOCUMENTS

| | | | | |
|---|---|---|---|---|
| 2009/0138200 | A1* | 5/2009 | Hunter | G01C 21/265 |
| | | | | 701/472 |
| 2012/0136573 | A1* | 5/2012 | Janardhanan | G01C 21/165 |
| | | | | 701/512 |
| 2012/0245839 | A1* | 9/2012 | Syed | G01C 21/165 |
| | | | | 701/408 |
| 2012/0296603 | A1* | 11/2012 | Kulik | G01C 21/16 |
| | | | | 702/160 |
| 2013/0029681 | A1* | 1/2013 | Grokop | G01C 21/16 |
| | | | | 455/456.1 |

\* cited by examiner

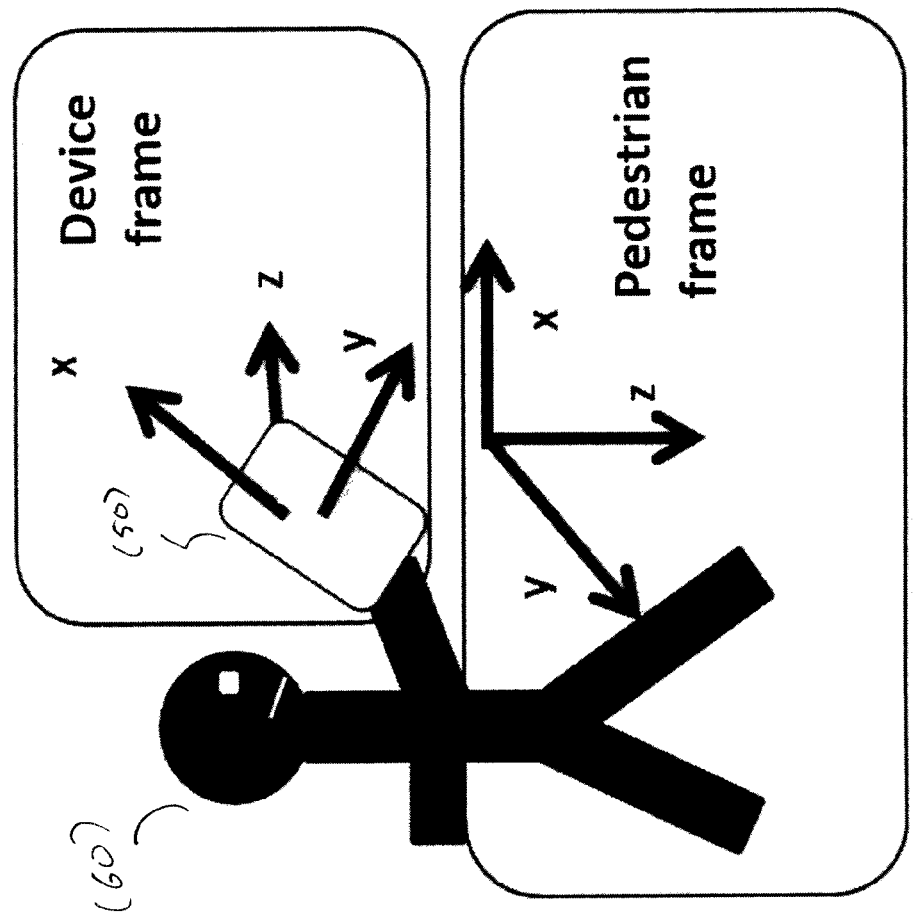
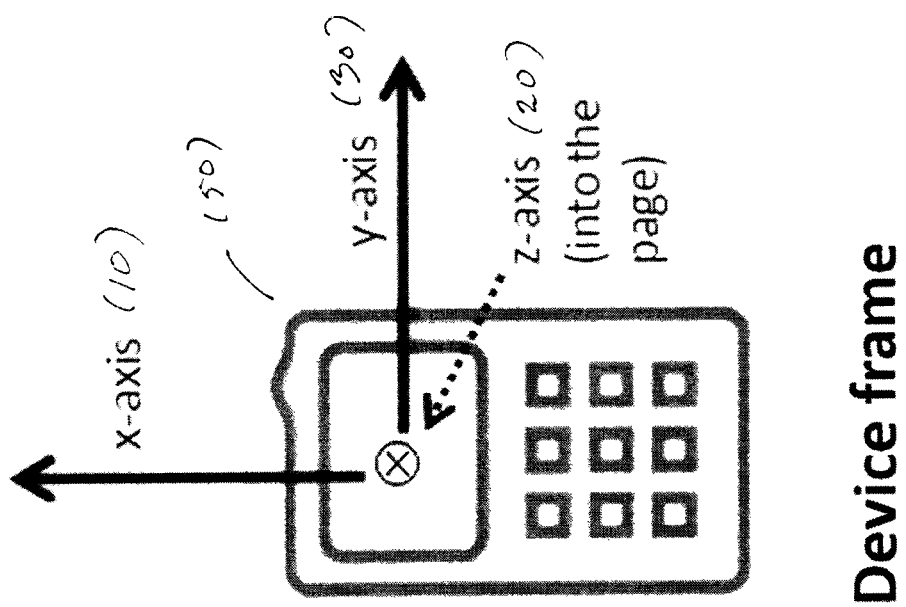
Figure 1

Figure 4
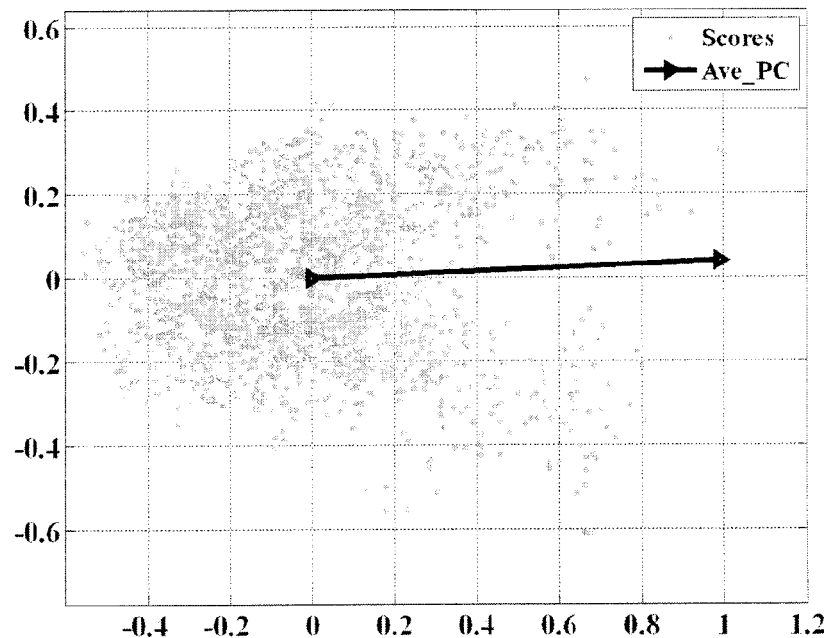
(a)
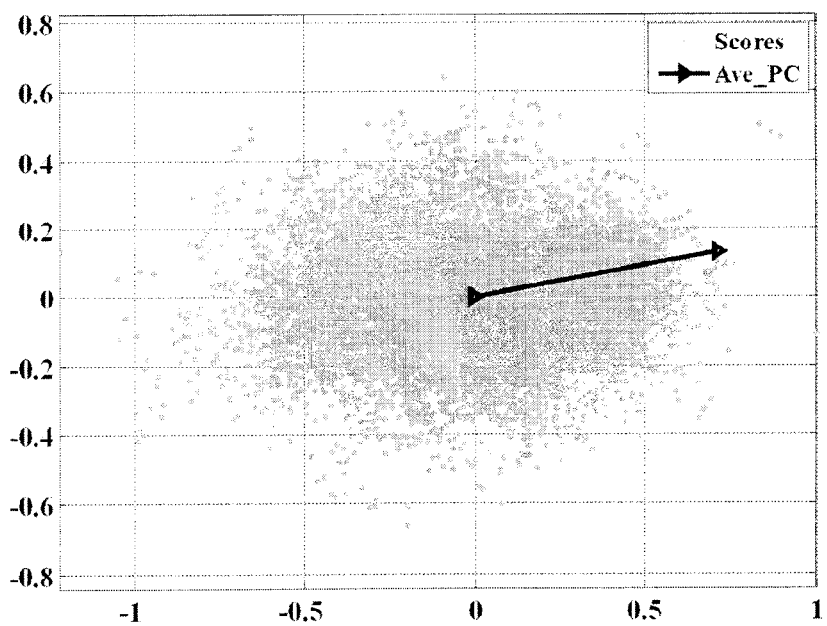
(b)

METHOD AND APPARATUS FOR DETERMINATION OF MISALIGNMENT BETWEEN DEVICE AND PEDESTRIAN

RELATED APPLICATIONS

This application claims the benefit of U.S. Provisional Patent Application No. 61/754,863 which is hereby incorporated by reference.

TECHNICAL FIELD

The present disclosure relates to a method and apparatus for determining the misalignment between a device and a pedestrian, wherein the pedestrian can carry, hold, or use the device in different orientations in a constrained or unconstrained manner.

BACKGROUND

Inertial navigation of a platform is based upon the integration of specific forces and angular rates as measured by inertial sensors (e.g. accelerometer, gyroscopes) of a device containing the sensors and positioned within a motion-capable platform. In traditional systems, the device is tethered to the platform. Measurements from the device may be used to determine the position, velocity and attitude of the device and/or the platform.

Alignment of the inertial sensors within the platform (i.e. alignment of the device containing the sensors with the platform's forward, transversal and vertical axis) is typically required for traditional inertial navigation systems. Where the inertial sensors are not properly aligned, the positions and attitude calculated using measurements from the inertial sensors will not be representative of the state of the platform. As such, in order to achieve high accuracy navigation solutions, inertial sensors must be tethered within the platform and careful manual mounting of the device within the platform is needed.

Portable navigation devices (or navigation-capable devices), however, are able to move, whether constrained or unconstrained within the platform (such as for example a person, vehicle, or vessel of any type), and careful mounting or tethering of the device to the platform is not an option.

Existing portable navigation devices (or navigation-capable devices) cannot achieve accurate attitude and position of the platform unless at least one of the following three conditions is known:

1) absolute attitude angles for the device and the platform;
2) absolute attitude angles for the device and the misalignment between the device and platform;
3) absolute attitude angles for the platform and the misalignment between the device and platform.

Since the first above option need two assemblies of sensors at least, one on the device and one on the platform, knowledge of misalignment is a key factor to enable portable navigation devices without the previously mentioned constraint.

As navigation-capable devices (e.g. mobile/smart phones) become increasingly popular, they can come equipped with Assisted Global Positioning System (AGPS) chipsets having high sensitivity capabilities capable of providing absolute positioning of the platform (e.g. user) even in environments without a clear line of sight to satellite signals. In environments where AGPS information alone is not enough, such as deep indoors or in challenging downtown navigation or localization, one possible solution is to incorporate cell tower identification or, if possible, trilateration of cell towers for a position fix (where AGPS solution is unavailable). Despite these two known positioning methods available in many mobile devices, accurate indoor localization still presents a challenge and fails to satisfy the accuracy demands of current location based services (LBS). Additionally, these methods may only provide the absolute heading of the platform, without any information on the device's heading.

Mobile navigation-capable devices (e.g. mobile/smart phones) can come equipped with Micro Electro Mechanical System (MEMS) sensors that are used predominantly for screen control and entertainment applications. These sensors have not been broadly used to date for navigation purposes due to very high noise, large random drift rates, and frequently changing orientations of the device with respect to the platform.

Mobile devices can also come equipped with magnetometers, and in some cases, it has been shown that a navigation solution using accelerometers and magnetometers may be possible if the user is careful enough to keep the device in a specific orientation with respect to their body, such as when held carefully in front of the user after calibrating the magnetometer.

There is a need, however, for a method of providing a navigation solution that is capable of accurately utilizing measurements from a navigation-capable device within a platform, and thereby determining the navigation state of the device/platform without any constraints on the platform (i.e. in indoor or outdoor environments) or the mobility of the device within the platform. The estimation of the position and attitude of the platform should be independent of the usage of the device (e.g. the way the user is holding or moving the device during navigation). The needed method should allow the device to be tilted in any orientation while still providing seamless navigation information without degradation in performance.

In addition to the above mentioned application of portable devices (that include a full navigation solution including position, velocity and attitude, or position and attitude), there are other applications (that may include estimating a full navigation solution, or an attitude only solution or an attitude and velocity solution) where the needed method is aimed at enhancing the user experience and usability, and may be applicable in a number of scenarios such as, for example:

video gaming equipment;
augmented reality equipment; or
wrist watches.

Some techniques available in the literature are able only to calculate just discrete or pre-determined values of the misalignment angle based on discrete use case classification of the device. This limits their usage to these discrete use cases, and even when one of the supported use cases is used the accuracy can deteriorate if the true misalignment value is somewhat different then the discrete misalignment value assigned with the classified use case (the latter may happen a lot in real life scenarios).

To resolve this key problem of misalignment determination between the device and the pedestrian, a former method in literature uses Principle Component Analysis (PCA) to obtain the direction of the axis of motion (i.e. the axis of the forward-backward motion direction with a 180 degrees of ambiguity). This means that PCA alone can't detect the forward direction from the backward direction. The rationale behind using PCA to obtain the direction of the axis of motion is that the variance of the acceleration vector is minimum along the lateral axis of the human body and maximum along the forward axis of the human body. Based on this theory, the motion axis of the device with respect to the user motion can be estimated but with a 180 degrees of ambiguity as explained above. In some former literature, the 180 degrees ambiguity problem of the direction of motion is resolved based on the idea that the PCA is implemented to the projected horizontal acceleration to get the direction of motion and the integration over the component is used to determine which way is front (leads to positive). However, this method was developed for device in pocket and is not suitable for all other device orientations. Another method in the literature to solve the 180 degrees ambiguity and to determine the forward direction is by testing whether the slope of vertical acceleration at the peak of acceleration in the motion signal in the forward-backward direction is increasing; if so the direction of the motion axis is forward otherwise it is backward. This technique does not work correctly for all device usages and orientations.

As such, there is a need for a method and apparatus to resolve the 180 degrees ambiguity and to be able to work for any device usage or orientation with respect to the pedestrian, and for various people's gaits and speeds.

SUMMARY

The present disclosure relates to a method and apparatus for determining the misalignment between a device and a pedestrian, wherein the pedestrian can carry, hold, or use the device in different orientations in a constrained or unconstrained manner, and wherein the device includes a sensor assembly. The sensors in the device may be for example, accelerometers, gyroscopes, magnetometers, barometer among others. The sensors have a corresponding frame for the sensors' axes. The misalignment between the device and the pedestrian corresponds to the misalignment between the frame of the sensor assembly in the device and the frame of the pedestrian. The present method and apparatus can work whether in the presence or in the absence of navigational information updates (such as, for example, Global Navigation Satellite System (GNSS) or WiFi positioning).

The present method and apparatus can work with various types of walkers with their different gaits and speeds. It can work with slow walking, normal walking or fast walking. Also, it can work with various types of runners with their different gaits and speeds.

The present method and apparatus can work with different device usages and orientations with respect to the pedestrian. For the purposes of this specification, the different usages and orientations of the device are defined as "device use cases". The use cases can include, for example: (i) handheld with all the different possible orientations including compass, texting portrait, texting landscape, or any arbitrary orientation (including any roll, pitch and heading); (ii) hand dangling (also called hand swinging) in any orientation whether horizontal or vertical, and in various types of dangling including very light, light, normal, or strong swinging; (iii) trouser pocket, whether front, side or back, with any type (tight pocket, loose pocket, etc.) and with any device orientation including for example horizontal, vertical, or tilted in any pose; (iv) belt, which means in any belt clip with any type, on any location on the belt all around, and with any orientation of the belt clip for example horizontal, vertical, or tilted in any pose; (v) ear, which means the pedestrian holds the device on or near his ear for listening/talking in any orientation including horizontal, vertical or tilted; (vi) shirt pocket with any device orientation or tilt for example horizontal, vertical, or tilted in any pose; (vii) jacket/suit pocket (whether side/chest/inner pocket) with any device orientation or tilt for example horizontal, vertical, or tilted in any pose; (viii) chest or back mount, which means the device is in a chest or back mount in any orientation or tilt for example horizontal, vertical, or tilted in any pose, and example of such mounts are those for soldiers, policemen, firefighters among other examples; (ix) backpack tethered or loose with any device orientation or tilt for example horizontal, vertical, or tilted in any pose; (x) laptop bag, whether the device is tethered or loose, with any device orientation or tilt for example horizontal, vertical, or tilted in any pose; (xi) purse, whether the device is tethered or loose, with any device orientation or tilt for example horizontal, vertical, or tilted in any pose; (xii) on the wrist (such as for example a smartwatch) in any orientation including horizontal, vertical or tilted; (xiii) head mounted (such as smart glasses, smart goggles, ear mounted systems, system on helmet, or any other sort of head mounted system); (xiv) running with the device in any of the above use cases or tethered to any part of the body with any device orientation or tilt for example horizontal, vertical, or tilted in any pose, some examples are leg, arm, wrist, chest mount, pocket, or any way of carrying. In all device usages and orientations, the present method can work with any roll, pitch, and azimuth (heading) angles of the device.

The present method and apparatus can be used to calculate a continuous misalignment angle covering the whole misalignment space, not just discrete or pre-determined values of such angle based on discrete use case classification of the device.

The present method and apparatus uses the accelerometer readings to determine the misalignment angle. The present method and apparatus can be used to give an output at a rate equal to or less than the rate of the accelerometer readings. In one embodiment, the present method can operate on buffered readings; while in another embodiment the present method can operate on instantaneous readings and automatically buffer only the needed quantities in the corresponding steps of the method. First, the received accelerometer readings can be levelled using the roll and pitch values. After the accelerometers' readings are levelled, the gravity value can be removed from the levelled vertical accelerometer data to give the vertical acceleration component. The horizontal acceleration components, after levelling, are the input parameters to a technique for obtaining maximum possible variance in the domain of input data. In one embodiment, the technique used for obtaining maximum possible variance is the PCA technique. The two horizontal acceleration buffers are fed to the PCA, which can generate the principle components of the two horizontal components buffers. An along-track angle can be calculated based on the returned values. However, this along-track angle has a 180 degrees ambiguity, that is, it can be for either the forward or backward direction of the misalignment angle. To get the motion direction, that is, to solve the problem of the 180 degrees ambiguity and decide if the direction of the motion is forward or backward, a transformation based on the along-track angle (whether it is the correct one or the 180 opposite one) can be applied to the levelled horizontal components. This operation can transform the levelled horizontal acceleration components to be the along-track acceleration component and the side-track (or lateral direction) acceleration component. The along-track acceleration component and the vertical acceleration component can be buffered for a predetermined duration.

To resolve the 180 degrees ambiguity in the along-track angle and calculate the correct misalignment angle, different buffers of data may be used; the along-track acceleration component buffer, the cross-track acceleration component buffer, the vertical acceleration component buffer, the magnitude of the horizontal acceleration buffer, and the magnitude of the 3D acceleration buffer. In some embodiments, a Low Pass Filter (LPF) can be applied to the buffers to make the buffered signals smooth. The patterns in the acceleration signals in the along-track and vertical buffers may have a different nature based on the device use case. A technique for determining or classifying the device use case can be run on the along-track and vertical buffers. Based on the result of the use case determination routine and possibly also based on the device type (for example smartphone, tablet, smartwatch, or head mounted/smart glasses), different techniques can be used to resolve the 180 degrees ambiguity and to correct the along-track angle to give the correct misalignment angle. If the resolving of the 180 degrees ambiguity fails, then the outcome of this method at the current iteration (that is, the current sample of accelerometer readings) can be a "no decision", which means the method cannot provide a correct misalignment angle.

In some embodiments, an optional routine to give a misalignment angle output in the case the main method gives a "no decision" output can be used; such an optional routine can be based on the history of any one or any combination of the following: (i) the buffered history of the along-track angle, (ii) the buffered history of the corrected misalignment angle, (iii) the buffered history of the output of the 180 degrees disambiguity resolution results, (iv) the buffered history of the roll and pitch angles, (v) the buffered history of the azimuth (heading) angle.

In some embodiments, an optional routine to enhance the misalignment angle calculation can be used, such an optional routine can be based on the history of any one or any combination of the following: (i) the buffered history of the along-track angle, (ii) the buffered history of the corrected misalignment angle, (iii) the buffered history of the output of the 180 degrees disambiguity resolution results, (iv) the buffered history of the roll and pitch angles, (v) the buffered history of the azimuth (heading) angle. In other embodiments, this routine can rely on smoothing, averaging or any type of filtering known to those skilled in the art, or any combination thereof, of any one or any combination of the above list of buffered quantities.

In some embodiments, an optional routine that calculates a standard deviation of the calculated misalignment angle can be used.

In some embodiments, an optional routine to enhance the misalignment angle calculation of the present method when absolute navigational information (such as for example GNSS or WiFi among others) is available and capable of calculating a pedestrian heading can be used.

In some embodiments, any one or any combination of the above-mentioned optional routines can be used.

Broadly stated, in some embodiments, a method for determining misalignment between a device and a pedestrian is provided, wherein the device includes a tri-axial accelerometer, the method including the steps of: a) calculating a plurality of levelled accelerometer readings from readings of the tri-axial accelerometer by transforming the tri-axial accelerometer readings into a levelled vertical accelerometer reading component and first and second horizontal acceleration components; b) generating a vertical acceleration component from the levelled vertical accelerometer reading component; c) calculating an along-track angle by applying a maximum possible variance technique on the first and second horizontal acceleration components; d) determining a use case of the device; e) detecting if a 180 degrees error in the along-track angle is present based on the use case; and f) calculating a misalignment angle from the along-track angle and, if present, the 180 degree error.

In an alternative embodiment, a method for determining misalignment between a device and a pedestrian, is provided wherein the device includes a tri-axial accelerometer, the method including the steps of: a) calculating a plurality of levelled accelerometer readings from readings of the tri-axial accelerometer by transforming the tri-axial accelerometer readings into a levelled vertical accelerometer reading component and first and second horizontal acceleration components; b) generating a vertical acceleration component from the levelled vertical accelerometer reading component; c) applying a Principal Component Analysis on the first and second horizontal acceleration components; d) calculating an along-track angle using outputs of the Principal Component Analysis, e) transforming the horizontal acceleration components using the along-track angle to generate an along-track acceleration component and a cross-track acceleration component; f) determining a use case of the device; g) detecting if a 180 degrees error in the along-track angle is present based on the use case, the along-track acceleration component and the vertical acceleration component; and h) calculating a misalignment angle from the along-track angle and, if present, the 180 degree error.

In another alternative embodiment, a method for determining misalignment between a device and a pedestrian is provided, wherein the device includes a tri-axial accelerometer, the method including the steps of: a) calculating a plurality of levelled accelerometer readings from readings of the tri-axial accelerometer by transforming the tri-axial accelerometer readings into a levelled vertical accelerometer reading component and first and second horizontal acceleration components; b) generating a vertical acceleration component from the levelled vertical accelerometer reading component; c) applying a Principal Component Analysis on the first and second horizontal acceleration components; d) calculating an along-track angle using outputs of the Principal Component Analysis; e) transforming the first and second horizontal acceleration components using the along-track angle to generate an along-track acceleration component and a cross-track acceleration component; f) determining a use cases of the device; g) detecting if a 180 degrees error is present in the along-track angle based on the use case, the along-track acceleration component and the vertical acceleration component, or declaring no decision; and h) calculating a misalignment angle, in case g) does not declare no decision, from the along-track angle and, if present, the 180 degrees error.

The detection if a 180 degrees error is present in the along-track angle may further be based on one or more of the following components selected from: the cross-track acceleration component, the magnitude of the first and second horizontal acceleration components, or the magnitude of the first and second horizontal and the vertical acceleration components. If the method declares no decision, then buffered information may be used to calculate the misalignment angle. The method may further include enhancing the misalignment angle using self-contained information or absolute navigational information. The method may further calculate a standard deviation for the calculated misalignment angle.

Another embodiment of the invention is a device portable by a pedestrian, the device including a tri-axial accelerometer; and a processor coupled to receive readings from the tri-axial accelerometer, and operative to determine the misalignment between the device and the pedestrian, wherein the processor is operative to: i) calculate a plurality of levelled accelerometer readings from readings of the tri-axial accelerometer by transforming the tri-axial accelerometer readings into a levelled vertical accelerometer reading component and first and second horizontal acceleration components; ii) generate a vertical acceleration component from the levelled vertical accelerometer reading component; iii) calculate an along-track angle by applying a maximum possible variance technique on the first and second acceleration components, iv) determine a use case of the device; v) determine if a 180 degrees error in the along-track angle is present based on the use case; and vi) calculate a misalignment angle from the along-track angle and, if present, the 180 degrees error.

DESCRIPTION OF THE DRAWINGS

FIG. 1 shows a misalignment example between the device frame and the pedestrian frame.

FIG. 4 shows scatter plot of principle components from example datasets.

DESCRIPTION OF EMBODIMENTS

Figure 2:
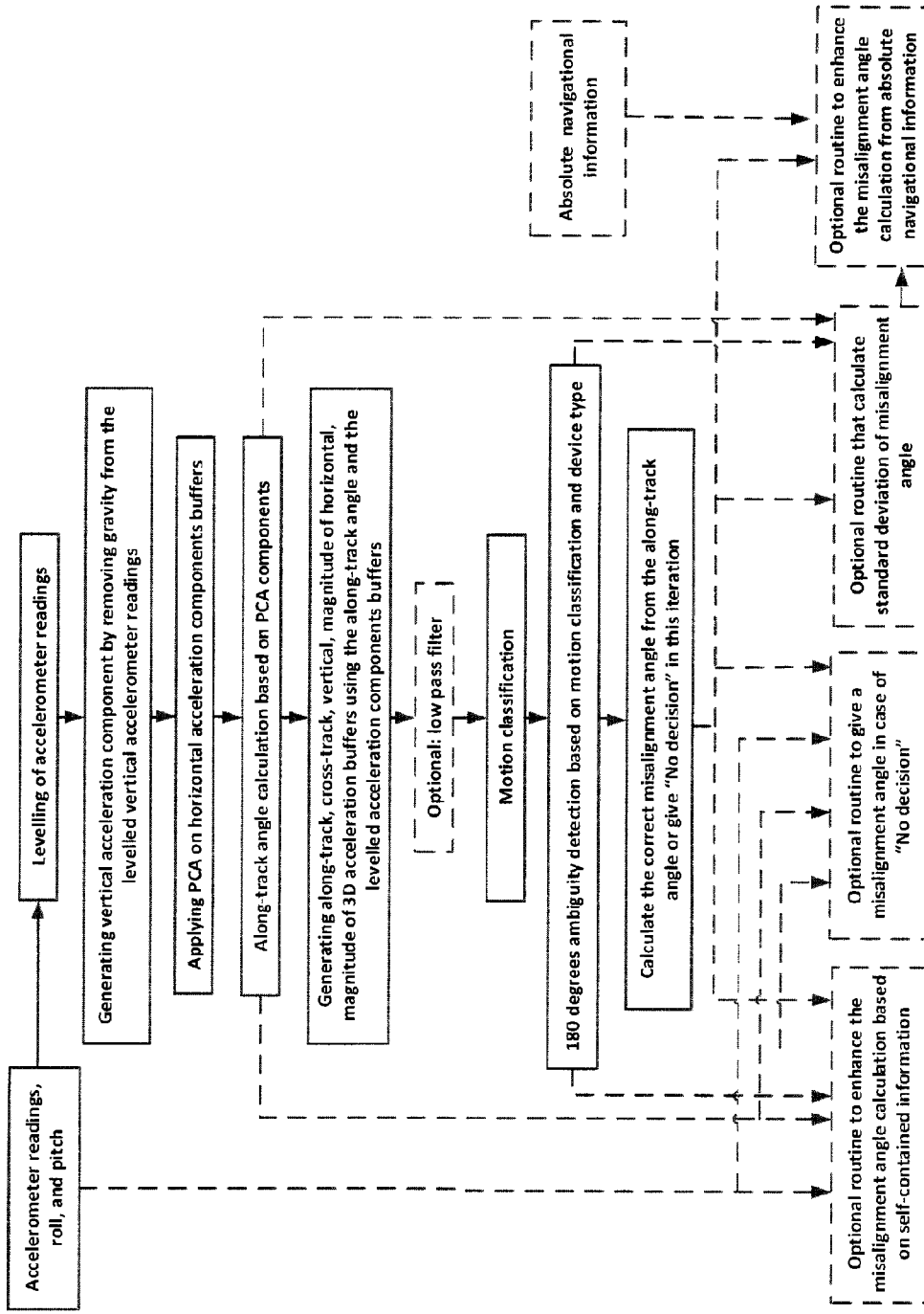
FIG. 2 shows a block diagram of one embodiment of the present method.

The present disclosure relates to a method and apparatus for determining the misalignment between a device and a pedestrian, wherein the pedestrian can carry, hold, or use the device in different orientations in a constrained or unconstrained manner, and wherein the device includes a sensor assembly. The sensors in the device may be for example, accelerometers, gyroscopes, magnetometers, barometer among others. The sensors have a corresponding frame for the sensors' axes. The misalignment between the device and the pedestrian means the misalignment between the frame of the sensor assembly in the device and the frame of the pedestrian. The present method and apparatus can work whether in the presence or in the absence of absolute navigational information updates (such as, for example, Global Navigation Satellite System (GNSS) or WiFi positioning).

In this document, a "pedestrian" is defined as a person on foot or performing on foot activities, such as, but not limited to, walking or running. The present method and apparatus are for determining the misalignment between a device and pedestrian regardless of the type or style of the on foot activity of the pedestrian. For walkers, the present method works with various types of walkers with their different gaits and speeds. It can work with slow walking, normal walking or fast walking. For runners, it can work with various types of runners with their different gaits and speeds.

Absolute navigational information is information related to navigation and/or positioning and are provided by "reference-based" systems that depend upon external sources of information, such as for example Global Navigation Satellite Systems (GNSS). On the other hand, self-contained navigational information are information related to navigation and/or positioning and are provided by self-contained and/or "non-reference based" systems within a device/platform, and thus need not depend upon external sources of information that can become interrupted or blocked. Examples of self-contained information are readings from motion sensors such as accelerometers and gyroscopes.

The present method and apparatus works with different device usages and orientations with respect to the pedestrian. The different usages and orientations of the device will be referred to herein as use cases. The use cases are such as, for example: (i) handheld with all the different possible orientations including compass, texting portrait, texting landscape, or any arbitrary orientation (including any roll, pitch and heading); (ii) hand dangling (also called hand swinging) in any orientation whether horizontal or vertical, and in various types of dangling including very light, light, normal, or strong swinging; (iii) trouser pocket with any type (tight pocket, loose pocket, etc.) and with any device orientation including for example horizontal, vertical, or tilted in any pose; (iv) belt, which means in any belt clip with any type, on any location on the belt all around, and with any orientation of the belt clip for example horizontal, vertical, or tilted in any pose; (v) ear, which means the pedestrian holds the device on or near his ear for listening/talking in any orientation including horizontal, vertical or tilted; (vi) shirt pocket with any device orientation or tilt for example horizontal, vertical, or tilted in any pose; (vii) jacket/suit pocket (whether side/chest/inner pocket) with any device orientation or tilt for example horizontal, vertical, or tilted in any pose; (viii) chest or back mount, which means the device is in a chest or back mount in any orientation or tilt for example horizontal, vertical, or tilted in any pose, and example of such mounts are those for soldiers, policemen, firefighters among other examples; (ix) backpack tethered or loose with any device orientation or tilt for example horizontal, vertical, or tilted in any pose; (x) laptop bag, whether the device is tethered or loose, with any device orientation or tilt for example horizontal, vertical, or tilted in any pose; (xi) purse, whether the device is tethered or loose, with any device orientation or tilt for example horizontal, vertical, or tilted in any pose; (xii) on the wrist (such as for example a smartwatch) in any orientation including horizontal, vertical or tilted; (xiii) head mounted (such as smart glasses, smart goggles, ear mounted systems, system on helmet, or any other sort of head mounted system); (xiv) running with the device in any of the above use cases or tethered to any part of the body with any device orientation or tilt for example horizontal, vertical, or tilted in any pose, some examples are leg, arm, wrist, chest mount, pocket, or any way of carrying. In all device usages and orientations the present method can work with any roll, pitch, and azimuth (heading) angles of the device.

The present method and apparatus is able to calculate a continuous misalignment angle covering the whole misalignment space, not just discrete or pre-determined values of such angle based on discrete use case classification of the device.

During normal use, the attitude of a device (e.g. portable phone) changes freely. Indeed, such devices often undergo rotational movements along any of their major axes (e.g. the x-axis, y-axis and z-axis) when positioned, for example, for texting in either landscape or portrait view, when positioned on a belt, in pocket, or near a user's ear during phone use (these are examples when the device is a phone). Such axes are defined in FIG. 1, wherein the forward axis (10) of the device is defined as x-axis, the vertical or z-axis (20) is pointing downward and the transversal axis or y-axis (30) is defined in a way to complete the right handed coordinate system.

The orientation of a device (50) within a platform (in the current disclosure a pedestrian carrying, holding or using the device) is not representative of the orientation of the platform or pedestrian. The device may undergo any number of rotational movements along any of its major axes, with respect to the platform. These rotational movements of the device do not indicate that the platform is going through the same changes in orientation. For example, the user or platform may be moving on a levelled 2D plane while the device may be undergoing any number of possible roll and pitch angles. FIG. 1 shows the relationship between an unconstrained device (50) and a pedestrian (60).

Typical portable devices include a tri-axial accelerometer for measuring accelerations or specific forces, along each of the sensitive axis, i.e., the x-axis, y-axis and the z-axis. The device may contain other sensors such as for example gyroscopes, magnetometers, barometer, among others.

Roll is defined as the rotation of the device along the forward x-axis, while pitch is the rotation along the lateral y-axis. Because the device user is free to rotate the device as desired, the device can have several changes in roll, pitch and azimuth (heading) with respect to the platform.

The presented method and apparatus uses the accelerometer readings to estimate the misalignment angle. The presented method and apparatus is able to give an output at a rate equal to or less than the rate of the accelerometer readings. In one embodiment, the presented method may take as input a buffer over a pre-determined duration of the following: the accelerometer readings, the roll angle values, and the pitch angle values. In another embodiment, the method may be taking instantaneous sample values of the accelerometer readings, the roll angle, and the pitch angle, and only buffering the needed quantities in the corresponding steps of the method.

First, each sample of the accelerometer readings, whether in the corresponding buffer or instantaneous, is levelled using the roll and pitch values of the device. The pitch and roll values may be calculated from any one of the following among others: (i) gyroscopes through any one of different methods such as for example quaternions, (ii) accelerometers readings or averaged accelerometer readings (whether fixed-time average or moving average), (iii) integrated navigation solution using any type of integration technique and integrating different sensors and/or systems such as for example some or all of the following: accelerometers, gyroscopes, magnetometers, barometer, odometer, or any navigational information updates (such as, for example, GNSS, WiFi, or any other wireless technique). The roll and pitch values used for levelling may be the instantaneous sample values or may be time averaged values (whether fixed time average or moving average) whether buffered or fed to the presented method epoch by epoch (each epoch corresponds to an accelerometer reading sample).

The operation of levelling the accelerometer readings transforms these readings into two horizontal acceleration components and one vertical component, which is the levelled vertical accelerometer reading. After the accelerometers' readings are levelled, the acceleration of the gravity value is removed from the levelled vertical accelerometer data to give the vertical acceleration component. The acceleration of the gravity can be obtained in one of different ways including different gravity models or databases.

The horizontal components are in the North-East plane or the horizontal plane, which is tangential to the Earth's ellipsoid at the current location of the device on Earth. The vertical component is perpendicular to this horizontal plane.

If the input data is instantaneous, i.e. not already coming as buffered data and the vertical acceleration is available in a buffer, then the vertical acceleration component is buffered. After levelling, the horizontal acceleration components buffers (whether calculated from input buffers or from instantaneous inputs and then buffering these in horizontal acceleration buffers) are the input parameters to a technique for obtaining maximum possible variance in the domain of input data. In one embodiment, the technique used for obtaining maximum possible variance is the PCA technique. The two horizontal acceleration buffers are fed to the PCA, which generates the principle components of the two horizontal components buffers. An along-track angle is calculated based on the returned values. However, this along-track angle has a 180 degrees ambiguity, i.e. it can be for either the forward or backward direction of the misalignment angle. To get the motion direction, i.e. to solve the problem of the 180 degrees ambiguity and decide if the direction of the motion is forward or backward, a transformation based on the along-track angle (whether it is the correct one or the 180 opposite one) is applied to the levelled horizontal acceleration components. This operation transforms the levelled horizontal acceleration components to give the along-track acceleration component and the side-track (or lateral direction) acceleration component. The along-track acceleration component and the vertical acceleration component are buffered for the same predetermined duration if the inputs to the method are not already in buffer format.

To resolve the 180 degrees ambiguity in the along-track angle and calculate the correct misalignment angle, different buffers of data may be used: the along-track acceleration component buffer, the cross-track acceleration component buffer, the vertical acceleration component buffer, the magnitude of the horizontal acceleration buffer, and the magnitude of the 3D acceleration buffer. An optional step to make the buffered signals smooth, an LPF may be applied to the buffers. The patterns in the acceleration signals in the along-track and vertical buffers may have a different nature based on the device use case. A technique for determining or classifying the device use case is run on the along-track and vertical buffers. Based on the result of the use case determination routine and possibly also based on the device type (for example smartphone, tablet, smartwatch, or head mounted/smart glasses), different techniques are used to resolve the 180 degrees ambiguity and to correct the along-track angle to give the correct misalignment angle. If the resolving of the 180 degrees ambiguity fails, then the outcome of this method at the current iteration (i.e. the current sample of accelerometer readings) is "no decision" which means the method cannot provide a correct misalignment angle.

An optional routine to give a misalignment angle output in case the main method gives a "no decision" output may be used, such routine is based on the history of any one or any combination of the following: (i) the buffered history of the along-track angle, (ii) the buffered history of the corrected misalignment angle, (iii) the buffered history of the output of the 180 degrees disambiguity resolution results, (iv) the buffered history of the roll and pitch angles, (v) the buffered history of the azimuth (heading) angle.

An optional routine to enhance the misalignment angle calculation may be used, such routine is based on the history of any one or any combination of the following: (i) the buffered history of the along-track angle, (ii) the buffered history of the corrected misalignment angle, (iii) the buffered history of the output of the 180 degrees disambiguity resolution results, (iv) the buffered history of the roll and pitch angles, (v) the buffered history of the azimuth (heading) angle. This routine may rely on smoothing, averaging, or any type of filtering of any one or any combination of the above list of buffered quantities.

An optional routine that calculates a standard deviation of the calculated misalignment angle may be used. In one embodiment, this routine may rely on the consistency of any one or any combination of the following: (i) the buffered history of the along-track angle, (ii) the buffered history of the corrected misalignment angle (one possibility is when it shows continuous flipping meaning frequent error in the 180 degrees disambiguity resolution, so the standard deviation is a function of the ratio of flipping), (iii) the buffered history of the output of the 180 degrees disambiguity resolution results (frequent changes between 0 and 180 degrees needed correction is indicative of erroneous behaviour, so the standard deviation is a function of the ratio of flipping).

An optional routine to enhance the misalignment angle calculation of the present method when absolute navigational information (such as for example GNSS or WiFi among others) is available and capable of calculating a pedestrian heading may be used. This means having a redundancy of information: (i) device heading from one or more its self-contained sensors, a fused version of its self-contained sensors, or from an integrated navigation solution; (ii) misalignment from the present method; (iii) pedestrian heading from the absolute navigational information. In one embodiment, the information from (i) and (iii) can be used to calculate another version of misalignment between device and pedestrian that can enhance, be integrated or fused with, be averaged or filtered with the misalignment from (ii). In another embodiment, the other version of misalignment between device and pedestrian calculated from (i) and (iii) can be used with a machine learning or training technique together with the misalignment from (ii) (especially when the misalignment from (ii) has a poor performance possibly indicated by the optional calculation of its standard deviation) to obtain better misalignment in such use cases even later when the absolute navigational information is blocked, interrupted or degraded. In yet another embodiment, both the last two ideas can both be applied in a third embodiment.

Any one or any combination of the optional routines can be used.

A block diagram of one embodiment of the method described in this patent is shown in FIG. 2. The optional parts are marked with dotted boxes.

It should be noted that the present method may be used in a variety of applications including those that comprise 2D or 3D navigation solutions including:
  2D or 3D position, velocity and attitude or
  only 2D or 3D position and attitude,
or partial 2D or 3D navigation solution including:
  only 2D or 3D velocity and attitude or
  only 2D or 3D attitude.
In case of 2D solutions, attitude is only the azimuth (heading) angle.

As an example application, the present method may be used with a pedestrian dead-reckoning (PDR) solution. PDR needs a pedestrian heading (azimuth) together with step detection and step length. The sensors in the device (such as for example accelerometers, gyroscopes, and magnetometers) can only give the device heading (azimuth) not the pedestrian heading. These two are not the same and have a misalignment between them as explained earlier depending on the use case of the device. So, if there is no absolute navigational information (such as for example GNSS or WiFi), or if the quality or nature of any available absolute navigational information is not adequate or not capable of calculating a pedestrian heading, then misalignment between device heading and pedestrian heading is needed in order to calculate the pedestrian heading given the device heading obtained from its self-contained sensors. The calculated pedestrian heading will be used for PDR. Even in cases where absolute navigational information are available, the device heading and the misalignment can be used to calculate a pedestrian heading to be used for PDR, then this solution can be integrated with the absolute navigational information to give a better solution that mitigates the drawbacks of both dead-reckoning and absolute navigational information. Any state estimation or filtering technique can be used for such integration.

In another example application, the misalignment angle from the present method can be used with any 2D or 3D navigation application where motion constraints that need this misalignment angle are applied to enhance the positioning or navigation solution (without any physical constraint on the usage of the device) such as, for example:

a. Non Holonomic Constraints (NHC): NHC is in the moving platform frame (which is here the pedestrian frame), so in order to apply NHC the transformation between the device frame and the pedestrian frame is needed which relies on the misalignment angle obtained by the present method.

b. PDR applied as a constraint to another integrated navigation solution whether 2D or 3D navigation solution, thereby providing improved positioning performance with low-cost sensors than the general inertial navigation. The dependence of PDR on the misalignment angle calculated by the present method is explained earlier. In general, the PDR results can be used in any of the following ways:
   i. To provide measurement update for the navigation solution (in addition to the possible calculation of the standard deviations for these updates),
   ii. To be integrated with the navigation solution in a Least Squares sense, or
   iii. Used as the only standalone positioning and navigation solution (as described above).

c. Map constraints: if environment maps (of any type) are available, the map constraints can be used to enhance the navigation solution. In order to use such constraint the pedestrian heading is needed, which can be calculated from the device heading and the misalignment calculated by the present method. if there is no absolute navigational information (such as for example GNSS or WiFi), or if the quality or nature of any available absolute navigational information is not adequate or not capable of calculating a pedestrian heading, then misalignment between device heading and pedestrian heading is needed in order to calculate the pedestrian heading given the device heading obtained from its self-contained sensors. The calculated pedestrian heading will be used for the map constraint for the navigation solution. Even in cases where absolute navigational information are available, the device heading and the misalignment can be used to calculate a pedestrian heading to be further integrated with the absolute navigational information to give a better solution. The map constraints to enhance a navigation solution can be used if PDR is utilized to further enhance the solution, or can be used if PDR is not used to enhance the main navigation solution.

When the method presented herein is combined in any way with a navigation solution whether 2D or 3D, this navigation solution can use any type of state estimation or filtering techniques. The state estimation technique can be linear, nonlinear or a combination thereof. Different examples of techniques used in the navigation solution may rely on a Kalman filter, an Extended Kalman filter, a nonlinear filter such as a particle filter, or an artificial intelligence technique such as Neural Network or Fuzzy systems. The state estimation technique used in the navigation solution can use any type of system and/or measurement models. The navigation solution may follow any scheme for integrating the different sensors and systems, such as for example loosely coupled integration scheme or tightly coupled integration scheme among others. The navigation solution may utilize modeling (whether with linear or nonlinear, short memory length or long memory length) and/or automatic calibration for the errors of inertial sensors and/or the other sensors used.

Contemplated Embodiments

The present disclosure describes the body frame to be x forward, y positive towards right side of the body and z axis positive downwards. It is contemplated that any body-frame definition can be used for the application of the method and apparatus described herein.

It is contemplated that the method and apparatus presented above may be used with a navigation solution that may optionally utilize automatic zero velocity periods or static period detection with possible zero velocity updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and may also be used with a backward smoothing module with any type of backward smoothing technique and either running in post mission or in the background on buffered data within the same mission.

It is further contemplated that the method and apparatus presented above can also be combined with a mode of conveyance technique or a mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that the method and apparatus presented above can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS), the forward integrated navigation solution in the device integrating the available sensors with the absolute navigational information (e.g. GNSS) and possibly with the optional speed or velocity readings, a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the method and apparatus presented above can also be used with a navigation solution that is further integrated with maps (such as street maps, indoor maps or models, or any other environment map or model in cases of applications that have such maps or models available), and a map matching or model matching routine. Map matching or model matching can further enhance the navigation solution during the absolute navigation information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigation information problems (degradation or absence), or they can totally replace the absolute navigation information in some applications.

It is further contemplated that the method and apparatus presented above can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements, such enhancement is the carrier-smoothed pseudorange.

It is further contemplated that the method and apparatus presented above can also be used with a navigation solution that relies on an ultra-tight integration scheme between GNSS receiver and the other sensors' readings.

It is further contemplated that the method and apparatus presented above can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the method and apparatus presented above can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be capable of relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

It is contemplated that the method and apparatus presented above can also be used with various types of inertial sensors, other than MEMS based sensors described herein by way of example.

Without any limitation to the foregoing, the embodiments presented above are further demonstrated by way of the following examples.

EXAMPLES

Example 1—PCA Based Misalignment Estimation Technique

Figure 3:
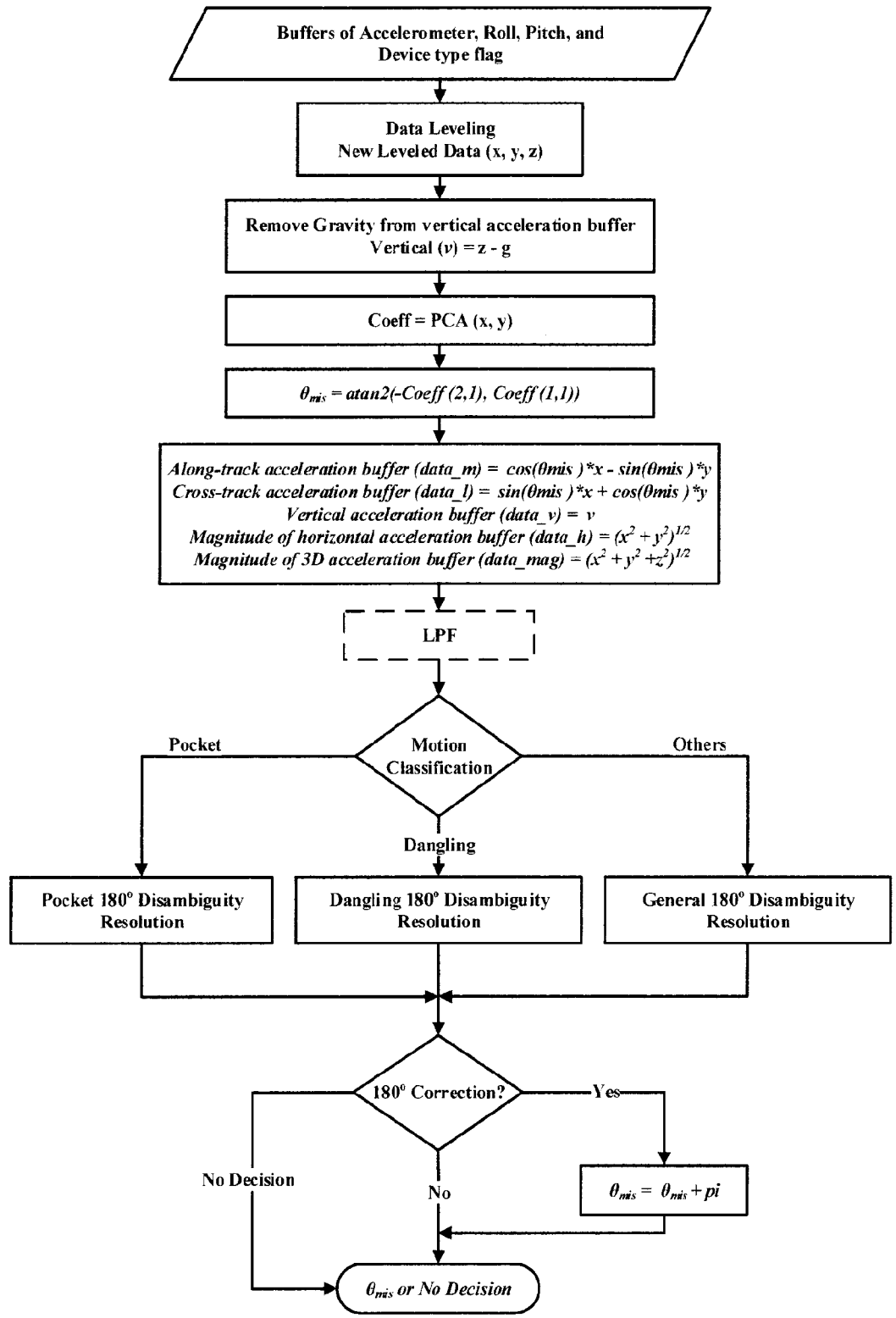
FIG. 3 shows a flowchart of one embodiment of the present method.

The proposed technique uses the accelerometer readings to estimate the misalignment angle ($\theta_{mis}$). First of all, the accelerometer readings are levelled using the roll and pitch values as shown in FIG. 3. After the accelerometers' data are levelled, the gravity value is removed from the levelled vertical accelerometer data to give the vertical acceleration component. The horizontal components are the input parameters to the PCA technique which generates the principle components of the horizontal components buffers. The along-track angle is calculated based on the components obtained by PCA technique. However, the calculated along-track angle can be either in the forward or backward direction. Different techniques are implemented to solve the problem of the 180 degrees ambiguity and decide if the direction of the motion is forward or backward. To get the motion direction, we apply a transformation based on the along-track angle (whether it is the correct one or the opposite one) to the horizontal axes. This operation transforms the horizontal acceleration components to the along-track motion direction and the side-track direction. To calculate the misalignment angle we used two main vectors of data; the first is the motion vector resulted from the levelling and transformation and the second one is the vertical vector resulted from the vertical axis after removing the gravity. To make the signals smooth, a LPF, which in this example was used with 4 Hz cut-off frequency, is applied to the motion and vertical signals. The use case of the device is classified using the motion classification technique. We have three main use case categories involved in the 180 degrees ambiguity solution: (i) Pocket with all its possible variations and orientations, (ii) Dangling with all its possible variations and orientations, (iii) All other use cases with all their possible variations and orientations.

The logic of the solution for the 180 degrees ambiguity is not the same for all use cases during the implementation. The pocket use case has different logic than dangling use case and both of them are different from other use cases. Consequently, we start with procedure by classifying the data into three main categories which are pocket, dangling, or others. In some cases, the use case determination or classification technique fails to recognize dangling or pocket correctly. However, these missed cases are taken into consideration in the general technique. Usually the missed cases behave more like others orientation, therefore some of them can be solved by general methods or special method designed especially for light dangling and light pocket behaviours. Once the data is classified into a certain category, the appropriate technique is called to deal with the data and generate the forward/backward solution. The techniques will make a decision about the data, whether it is forward or backward. If the decision is backward then the first estimated misalignment is corrected by adding 180 degrees. Otherwise the estimated angle will be returned without any change.

Levelling

The accelerometers' data is levelled to the horizontal plan using the estimated roll and pitch values estimated from the system. Throughout the work the roll angle is defined as the angle that rotates around x-axis while pitch angle is defined as the angle that rotates around y-axis. In order to transfer observations (x acceleration and y acceleration) into horizontal plane, the direct cosine matrix (DCM) is built by using Euler angle (roll ($\phi$), pitch ($\theta$) and azimuth ($\psi$).

The transferring equation of the levelling process is shown in Equation 1.

$$DCM = \begin{bmatrix} \cos\theta\cos\psi & -\cos\phi\sin\psi + \sin\phi\sin\theta\cos\psi & \sin\phi\sin\psi + \cos\phi\sin\theta\cos\psi \\ \cos\theta\sin\psi & \cos\phi\cos\psi + \sin\phi\sin\theta\sin\psi & -\sin\phi\cos\psi + \cos\phi\sin\theta\sin\psi \\ -\sin\theta & \sin\phi\cos\theta & \cos\phi\cos\theta \end{bmatrix} \quad (1)$$

$$\begin{bmatrix} x \\ y \\ z \end{bmatrix} = DCM * \begin{bmatrix} x_{sensor} \\ y_{sensor} \\ z_{sensor} \end{bmatrix}$$

Gravity Removing

The levelling process transfers x and y accelerometer's data into the horizontal plane and z is the vertical axis. Axis z contains gravity component which make its magnitude value bigger than the values of x and y axes. To make all axes have a close range of values, we remove the gravity from the vertical axis. The gravity is removed by subtract the value of g from the vertical component.

$$\text{vertical\_vector}(data\_v) = z - g \quad (2)$$

Principle Component Analysis

After levelling these measurements to the horizontal plan, it is easy to observe the point cloud of 2-dimensional acceleration is distributed like an ellipse. It is caused by the fact that humans walk forward with some lateral movement too. Assume there is no other significant motion except forward motion and lateral motion, the ellipse's major axis corresponds to the forward acceleration while the minor axis corresponds to the lateral acceleration generated majorly by the switch of the steps. In order to calculate the vector of major axis and minor axis, PCA is implemented. PCA is an ordination technique which involves the Eigen-analysis of the data matrix. The data matrix is composed of rows corresponding to observations, and columns to variables. PCA chooses the first PCA axis as the line that minimizes the square of the distance of each point to that line. Equivalently, this line goes through the maximum variation in the data. The first stage in PCA is to standardize the data by subtracting the mean, and then singular value decomposition (SVD) is implemented to get the eigenvectors of x-axis and y-axis. The SVD technique used here is Householder transformation which is useful in numerical linear algebra to calculate tri-diagonal and symmetric matrices.

The principle of Householder is to do n−2 times of orthogonal transformation of n dimensional matrix (A):

$$A_{n-2} = P_{n-3} \ldots P_1 P_0 A P_0 P_1 \ldots P_{n-3}.$$

Where $P_i$ is calculated by:

$$\sigma_i = \sqrt{(a_{t0}^i)^2 + (a_{t1}^i)^2 + \ldots (a_{t,t-1}^i)^2}$$

$$U_i = (a_{t0}^i, a_{t1}^i, \ldots a_{t,t-2}^i, a_{t,t-1}^i \pm \sigma_i, 0, \ldots, 0)^T$$

$$H_i = \tfrac{1}{2} U_i^T U_i$$

$$P_i = I - U_i U_i^T / H_i$$

After getting the tri-diagonal and symmetric matrix ($A_{n-2}$), the QR technique is implemented to calculate the eigenvectors and eigenvalues. The basic idea of QR decomposition is to write the matrix as a product of an orthogonal matrix and an upper triangular matrix, multiply the factors in the reverse order and iterate. From a simply visualized concept, the SVD procedure rotate unit matrix by using v* matrix, scale it using Σ along the rotated coordinate axes and then use second rotation U matrix to rotate it again to generate target matrix (A) as in Equation 3:

$$A = U \Sigma V^* \quad (3)$$

Here it is obvious the target matrix (v*) contains the information of the misalignment angle. The first column in v* matrix represents the primary component vector and the second column represents the secondary component vector. It is important to know they are orthogonal vectors. That means the columns are in order of decreasing component variance. It is worth mentioning that the first value in the primary component vector means what level the x data's contribution is to the primary component vector and the second value means level of y data's contribution to the primary component.

Along-Track Angle Estimation

The device direction can be estimated using the embedded sensors with the device. Utilizing these sensors can estimate the heading of the device. However, such direction doesn't present the true direction as the device can be held in different orientations rather than the user direction. Holding the device in any orientation makes device heading not identical to the user direction, the difference is called the misalignment angle. As a result, the solution should be corrected or compensated by this angle. A misalignment angle estimation technique is implemented based on the PCA technique. For the user convenience, the portable navigation device can be held in any orientation such as compass, belt, texting, dangling, etc. when the user starts the activity such as walking, running, or driving; there are two major directions; one is the direction of the motion which is identical with the user direction and the second one is the device direction.

The PCA technique is used to transform the acceleration measurements into a set of uncorrelated variables called the principal components. The technique uses the horizontal acceleration, axes x and y data to calculates the principle components for the 2D vector, $[x^T\ y^T]$. Therefore, the result of the process generates two principle components; one is called primary component while the second is called the secondary component.

The plot of the principle components shows that the primary component indicates the approximate value of the misalignment angle. The trajectory is divided into windows with 2 seconds data length. For each window there is one primary component vector. The accumulated primary components in every window show that a considerable portion of the vector direction is very close to the expected misalignment. FIG. 4 shows a plot of the scores, measurements, of the samples with 180 degrees misalignment angle. The direction of the scores represents the Principal Components (PC) associated with the sample. The Ave_PC represents the average vector for all primary principle components. The direction of the vector represents the misalignment angle which refers to 0°. FIG. 4 shows the importance of using 180 degrees correction to adjust the solution to the correct value which is 180 degrees.

Figure 5:
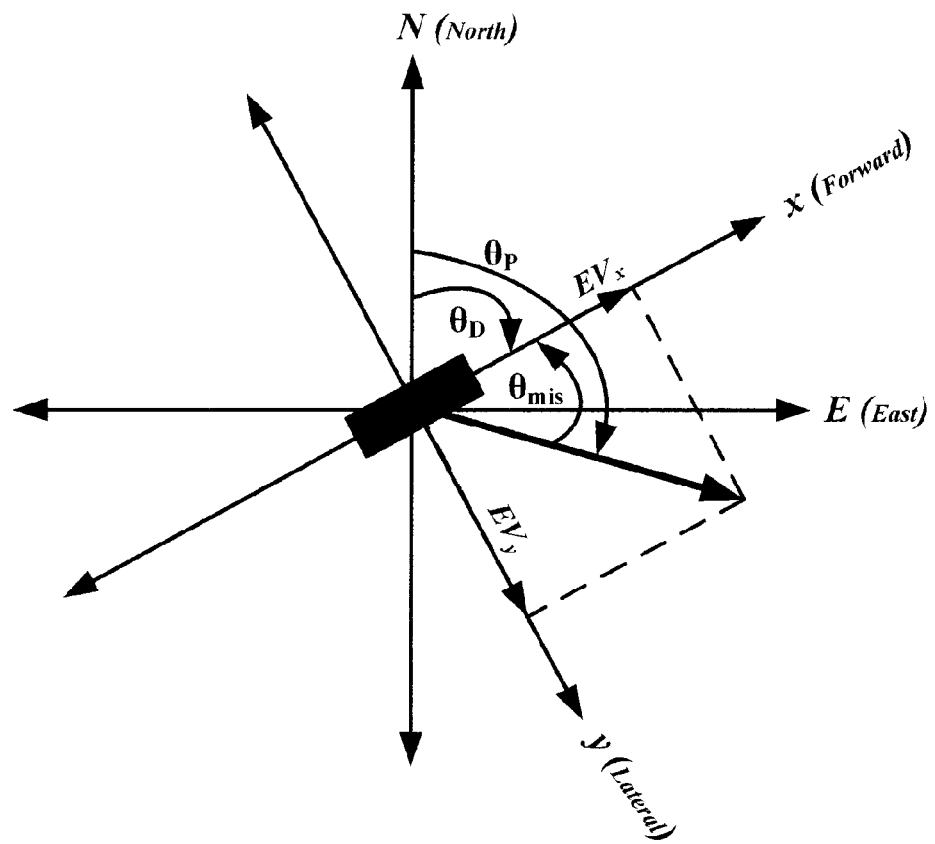
FIG. 5 shows the device azimuth, the pedestrian azimuth, the misalignment angle, and the vector representation of the principle components.

The misalignment angle can be determined by calculating the angle using the primary component vector. Suppose that:
$EV_x$ represents the first value in primary component
$EV_y$ represents the second value in primary component
E is (East) and N is (North) for the user coordinate
$\theta_P$ is the platform (pedestrian) azimuth
x represents the forward direction of the device
y represents the lateral direction of the device
$\theta_D$ is the device azimuth
$\theta_{mis}$ is the misalignment angle
As shown in the FIG. 5, the misalignment angle is estimated as the difference between the device heading and the pedestrian heading as in Equation 4:

$$\theta_{mis} = \theta_D - \theta_P \quad (4)$$

Figure 6:
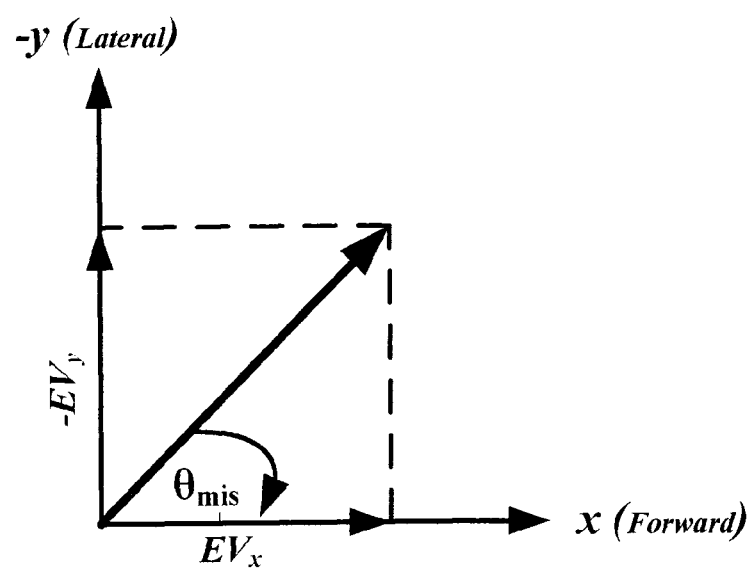
FIG. 6 shows the vector representation of the misalignment angle with the principle components.

FIG. 6 shows the projection of the principle components in the device frame. Analyzing the vectors gives the angle as in Equation 5:

$$\theta_{mis} = \tan^{-1}\left(\frac{-EV_y}{EV_x}\right) \quad (5)$$

The misalignment angle can be estimated from the principle components which are produced by the PCA technique.

Along-Track Acceleration, Cross-Track Acceleration, Vertical Acceleration, Magnitude of Horizontal Acceleration, Magnitude of 3D Acceleration Vectors We have two different forward directions; device's forward and user's forward. The device's forward direction is already defined in the device frame. However, the pedestrian's forward direction is defined as the motion direction which is a result of both x and y directions. To solve the 180 degrees of ambiguity, the motion direction is calculated by transforming x and y axes into the user plane. To achieve that, we rotate the device's horizontal plane around z axis by $\theta_{mis}$. The resulted vectors are the motion direction vector (along-track) and the lateral direction vector (cross-track).

$$\begin{bmatrix} \text{motion\_vector} \\ \text{lateral\_vector} \end{bmatrix} = \begin{bmatrix} \cos(\theta_{mis}) & -\sin(\theta_{mis}) \\ \sin(\theta_{mis}) & \cos(\theta_{mis}) \end{bmatrix} \begin{bmatrix} x \\ y \end{bmatrix} \quad (6)$$

As a result of the previous transformation, the motion (along-track) and lateral (cross-track) vectors are calculated as Equation 7:

$$\text{motion\_vector}(data\_m) = \cos(\theta_{mis})*x - \sin(\theta_{mis})*y$$

$$\text{latera\_vector}(data\_l) = \sin(\theta_{mis})*x + \cos(\theta_{mis})*y \quad (7)$$

The vertical acceleration vector is calculated as shown in Equation 2 while the magnitude of the horizontal and 3D accelerations vectors are calculated based on Equation 8:

$$\text{horizontal\_vector}(data\_h) = \sqrt{x^2 + y^2}$$

$$\text{acceleration\_magnitude\_vector}(data\_h) = \sqrt{x^2 + y^2 + z^2} \quad (8)$$

Low Pass Filter

Some components in the signal are more important than others depending on the purpose of the signal usage. The low pass filter (LPF) is employed for removal high-frequency noise. Consequently, the filtered data becomes smoother and less dependent on short changes. In our application, the behaviour of the user is unexpected and we might get too much change in the signal in short period of time. The most important part of the data is the part which is caused by motion of the device. To extract this, a low pass filter with 4 Hz frequency is applied for motion and vertical vectors to reduce the effect of sudden changes on the accelerometer data. This means only signal frequency lower than 4 Hz can pass the filter.

Device Type

The present method can work with different devices with different device usages and orientations with respect to the pedestrian. Devices include smartphones, tablets, glasses, head-mounts, smartwatches, etc. As in the embodiment, not all use device use cases are applicable for all type of devices. Therefore, there is a routine to provide a flag with the device type to ease the recognition between the different devices. The different signals such as motion, lateral, and vertical have different characteristics based on the used device. So, there are methods developed for certain devices or certain uses cases. The technique uses the device flag to activate/disable certain parts in the technique.

Determination of Use Case (Motion Classification)

The determination of use case, which is also referred to herein as "Motion classification", is designed for distinguishing data into three different modes: pocket, dangling and general (which includes belt, hand held, ear talking, chest, backpack, purse, laptop bag, etc.). Since both pocket and dangling movements involve not only trunk force but also additional force from thigh and arm, the relationship between motion signal, vertical signal and attitude signal is no longer consistent with general cases. However, these additional forces sometimes emphasize peaks amplitude; therefore it improves the procedure of detecting peaks and increasing the probability of right solution. In case of normal dangling, the amplitude of motion is much bigger than the amplitude of vertical signal. Signal with such criteria will be classified directly to dangling. Otherwise, derived statistics are used to distinguish dangling and pocket data set. Once the dataset is classified into pocket or dangling, these additional forces emphasize peaks amplitude and therefore the procedure of detecting peaks becomes easier. The implemented method deals with the device in vertical and horizontal orientation. Different criteria are designed to recognize the slow motion or unpredictable walking behaviour. The implemented methods use statistics values derived from several experiments which includes slow walking, normal walking, women's walking and men's walking.

The technique starts with determining which attitude gains bigger contribution from the movement to be used. Since some walkers have unexpected and irregular movements, the threshold used in attitude peak detection has to be adapted according the amplitude of signal itself. Due to the additional force from thigh and arm, there is a change or variation in the roll or pitch values according to the device orientation called the attitude changing range while the device orientation, horizontal or vertical, makes the variation to appear in roll or pitch values. A major difference between dangling and pocket is the phenomenon that dangling has a relative consistent and smooth motion curve than vertical signal. The light walkers also are considered in the classification process where the vertical signal for light walkers has less power, the sharp vertical peaks are easily buried under noise. According to the signal features, if the technique found out that vertical signal is not obvious, it will directly use highest vertical peak to check if a unique pocket's pattern exist. Pocket pattern is built on the theory that when thigh moves forward, motion signal has relative same trend. The pocket logic determination is based on the relationship of attitude variation and shape with motion and vertical signals. The output of this use case determination guides the technique for the choice of functions to be used to solve the 180 degrees ambiguity problem.

180 Degrees Ambiguity Detection for Pocket

This function is used to solve the 180 degrees ambiguity for the pocket orientation through the relationship between thigh attitude, motion feature and vertical signal. The proposed technique will only be used after motion classification function when it has been classified into pocket. By the experiments, the relationship between motion signal, vertical signal and thigh attitude was built by the relative location of peaks. These experiments include light walker, slow walker, man and woman. The proposed technique works with 8 different orientations where 4 orientations have gravity component in x and −x axis, 4 orientations have gravity component in y and −y axis. In order to generalize the technique, it also has been tested in loose pocket and tight pocket for different types of pocket such as pant pockets (front and back pockets).

The technique has been tested by unstable motion signal which usually has problem in detecting peaks on signal wave. Finding the peaks of the vertical, motion and attitude signals is the first step in the solution. Each signal has different threshold depending on the signal condition. Since different users have different walking patterns, the threshold will be changed several times to properly detect enough high peaks and low peaks. For detecting motion peaks, light walker style and normal walker style are separated by the condition of vertical data range which is predetermined. If there is no peak detected, the threshold will be reduced according to the walker style. The technique uses the attitude data that has bigger variation. According to the corresponding sign of attitude, a different technique will triggered. There are two representative forward patterns that have the following two series:

Sharpest vertical peak appears at upper attitude wave, then next low attitude peak will have one high motion peak comes around.

Sharpest vertical peak appears at lower attitude wave, next high attitude peak will have one motion high peak comes around.

Representative backward patterns have the following two series:

Sharpest vertical peak appears at lower attitude wave, then next high attitude peak will have one low motion peak comes around.

Sharpest vertical peak appears at upper attitude wave, next low attitude peak will have one motion low peak comes around.

If there is no low attitude peak (no complete half wave) then it switches to the attitude peak that comes just before highest vertical peak.

The technique returns the results as Forward/Backward. If for any reason the technique cannot determine if there is a 180 degrees ambiguity or not (Backward/Forward), instead, it will return Undetected.

180 Degrees Ambiguity Detection for Dangling

The function is used to solve the 180 degrees ambiguity for the dangling orientation through different methods which are implemented to handle different situations in the input data. Different methods are implemented to deal with the different situations in the input data. There are 24 different orientations are considered in the dangling mode where 16 orientations in the horizontal and 8 in the vertical. The horizontal plan is represented by z, −z, y, and −y axes are having the gravity component while the vertical is represented with x and −x are having the gravity component. The proposed technique deals with the normal walking signal. However, the proposed technique solves the problem with the case of strong dangling, normal dangling, light dangling, dangling with different motion speeds, dangling with unstable motion signal, unstable vertical signal, and when the dangling has vertical signal with high amplitude value comparing to the motion signal values. Through various methods, peaks are used to make the Forward/Backward decision. In certain situations thresholds values are used to enforce the solution while in other situations they are used to accept or refuse peaks. Some situations are required to be handled prior to others therefore the order of the methods is prepared carefully. In some situations, a pattern of vertical and motion peaks is used to make the decision of Forward/Backward. In other situations, the sign of the motion data slope around the vertical peaks (all peaks, some peaks over or below certain threshold, the maximum peak, or the minimum peak) provides the Forward/Backward decision.

Finding the peaks of the vertical and motion signals is the first step in the solution. Through various methods, peaks are used to make the Forward/Backward decision. In certain situations thresholds values are used to enforcement the solution while in other situations they are used to accept or refuse peaks. Some situations are required to be handled prior to others therefore the order of the methods is prepared carefully.

The technique returns the results as Forward/Backward. If for any reason the technique cannot determine if there is a 180 degrees ambiguity or not (Backward/Forward), instead, it will return Undetected.

180 Degrees Ambiguity Detection for Other Cases (General)

The implemented method includes several sub-methods to solve the 180 degrees ambiguity for many orientations such as belt, hand held texting or reading, ear talking, backpack, chest, jacket/suit pockets, laptop bag, purse, missed pocket and dangling cases. Some of them have several similarities in statistical values; different criteria are designed to help the technique trigger the appropriate part.

The implemented methods deal with the device in vertical and horizontal orientation. Different criteria are designed to help in recognizing the slow motion or unpredictable walking behaviour. Also, the implemented methods can deal with the unstable motion behaviour in different use cases such as light walking where the user is not walking properly. The result of the light walking is unstable or distorted motion or vertical signals.

For example;

- In light and slow handheld cases, the signal has a relatively complex structure with relative small range of the vertical signal which indicates that the case is not a normal handheld case. Therefore, the vertical peak locations are unstable and inconsistent leading to change in the normal pattern of the handheld signal. Some other methods deal with the extremely slow motion where other methods deal with handheld cases especially when motion signals have large amplitude.
- Some methods deal with cases of light dangling, which is not properly classified as dangling, where in some cases light dangling signal pattern has the same behaviour of the belt pattern but with the reverse Forward/Backward logic which should be recognized.
- Some methods deal with cases of light dangling, which is not properly classified as dangling, in the horizontal orientation only excluding the vertical cases. In some cases, light dangling signal or pocket pattern has the same behaviour of the belt pattern but with the reverse Forward/Backward logic which should be recognized.
- Some methods are developed to deal with the belt signal when it has pocket pattern but with reverse logic of Forward/Backward.
- In some cases where the dataset has variation in roll or pitch data such as belt, dangling, pocket, etc., the variations in roll and pitch are detected and compared to check the change in the roll and pitch and use the data which has bigger change.
- Some methods are developed to deal with the cases of ear talking dataset which has relatively higher power and noise in motion signal taking the unstable ear signal in consideration. In this case, local bump area is used to determine the Forward/Backward decision as bigger positive bump corresponding to backward, vice versa.
- Other methods use the attitude information (roll and pitch) for special belt cases that can arise due to slow belt and light belt motion.
- Other methods deal with the jacket/suit pockets when it has the handheld pattern but with reverse logic of Forward/Backward.

In some situations the use case determination or classification technique fails to classify the pocket or dangling orientations due to unpredictable user behaviour during walking. The reason for these exceptions is usually caused by the low standard deviation in motion signal and vertical signal. While standard deviation is small, peaks location becomes very challenging to locate correctly. In order to solve this problem, two solutions are provided in this function: (1) Regulation by deleting unreasonable peaks. (2) Use different threshold to generate different pair of peaks, namely, slow peaks used mainly for slow motion, normal peaks after strict tests to keep peaks' amplitude larger than the median line and to keep peaks series reasonable. Peak detection plays a key role in the operation of 180 degrees of ambiguity detection. If the number of peaks is not enough, the peak detection technique is adapted to change the threshold. In addition, the signal shape is another key factor in telling the technique what kind of movement it is most likely.

The motion classification sometimes fails to recognize pocket and dangling correctly due to the distortion in the signal. Some methods are implemented to handle the cases of missed dangling or missed pocket at normal or slow walking. In some situations, a pattern of vertical and motion peaks is used to make the decision of Forward/Backward. In other situations, the sign of the motion data slope around the vertical peaks (all peaks, some peaks over or below certain threshold, the maximum peak, or the minimum peak) gives Forward/Backward decision. In other cases, the 180 degrees ambiguity is detected using the integration of the motion signal by comparing both positive and negative sides of the area under the curve.

After several slow walking tests, we discover the relationship between motion peaks and vertical peaks will be reversed. Therefore, at the end of General function, it checks if the tag of slow motion is already set to be true. If the technique detect this is a slow motion but without decision from slow motion method, the decision will be reversed.

The technique returns the results as Forward/Backward. If for any reason the technique can't decide if there is a 180 degrees ambiguity or not (Backward/Forward), instead, it will return Undetected.

Correction for the 180 Degrees Ambiguity

The 180 degrees ambiguity is solved based on the decision from the different functions. The received decision contains three possibilities; forward, backward, or no decision. Backward decision means that the direction of the device is opposite to the direction of the motion which requires 180 degrees to be corrected. We add 180 degrees to the estimated misalignment angle if the decision is backward. On the other hand, forward decision means that the device is in the same direction of the motion and no correction is needed. However, no decision means that the techniques can't make a decision if it is forward or backward. In this case an optional routine to give a misalignment angle output may be used, such routine is based on the history of any one or any combination of the following: (i) the buffered history of the along-track angle, (ii) the buffered history of the corrected misalignment angle, (iii) the buffered history of the output of the 180 degrees disambiguity resolution results, (iv) the buffered history of the roll and pitch angles, (v) the buffered history of the azimuth (heading) angle. One example option in such a case of no decision is to keep the corrected misalignment angle of the last iteration with a decision (iteration is defined as every sample of accelerometer data).

Overall Navigation Results

For demonstration purposes, eleven trajectories for walking and running are presented in the coming examples. In Example 2, there are two trajectories for walking with a navigation-capable prototype. Example 3 shows three trajectories for walking with smartphone. Two trajectories for walking with tablet are presented in Example 4. Walking with Smartwatch in different use cases is illustrated by one trajectory in Example 5. Finally, Example 6 presents three trajectories for running with the smartphorie use cases.

Example 2—Results for Walking with a Navigation-Capable Prototype

A low-cost prototype unit (for the portable device) including a six degrees of freedom inertial unit from Invensense (i.e. tri-axial gyroscopes and tri-axial accelerometer) (MPU- 6050), tri-axial magnetometers from Honeywell (HMC5883L), barometer from Measurement Specialties (MS5803), and a GPS receiver from u-blox (LEA-5T) was used to log data for a large number of pedestrian trajectories for different users with different gaits and different speeds. These trajectories comprised a lot of different use cases for the prototype device including a lot of handheld in several different orientations, a lot of hand dangling of different types and orientations, a lot of pocket with different types and orientations, a lot of belt with different belt clips in different orientations, a lot of ear.

Figure 7:
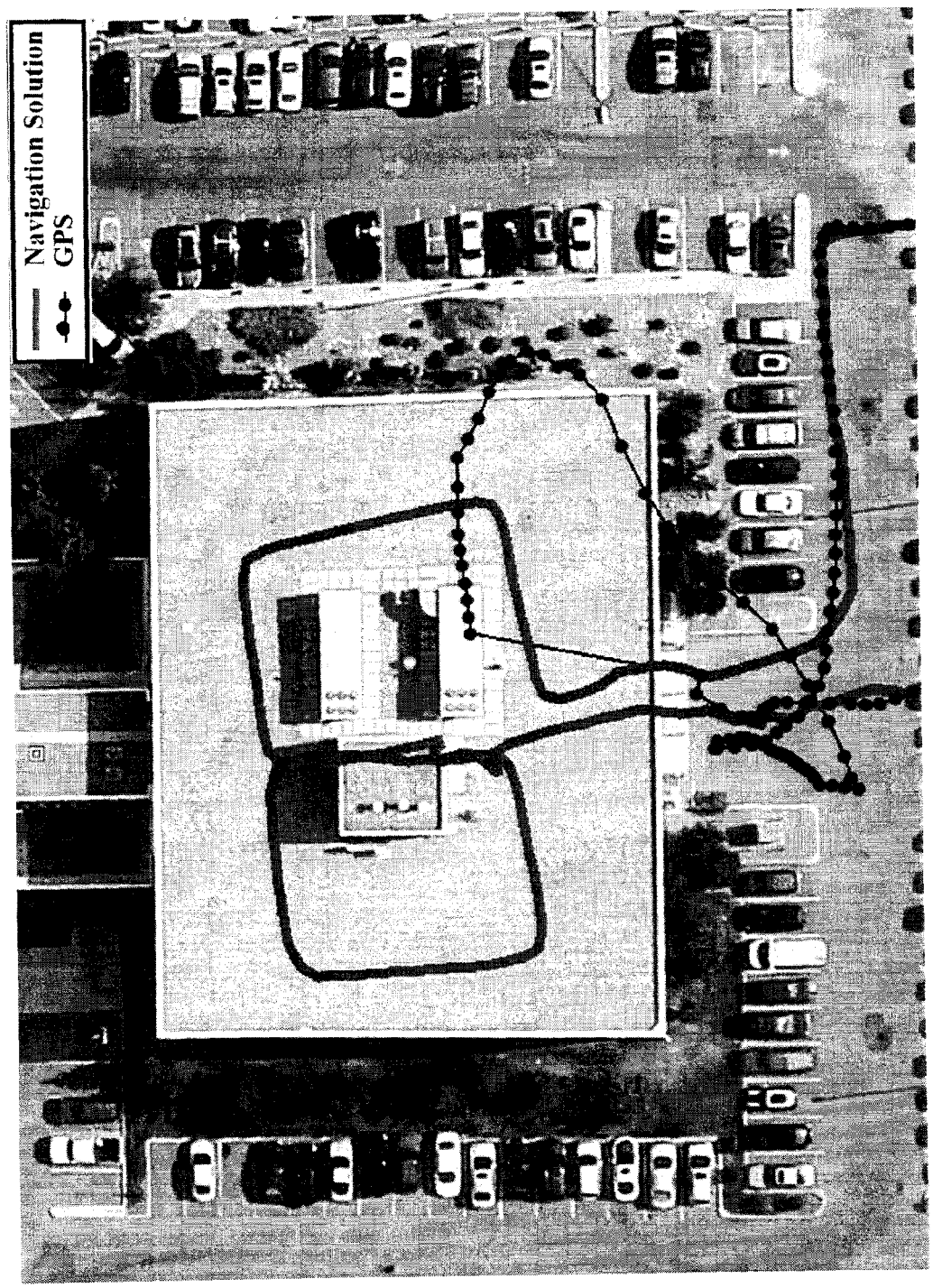
FIG. 7 shows the first trajectory positioning results with different device use cases and misalignments.
Figure 8:
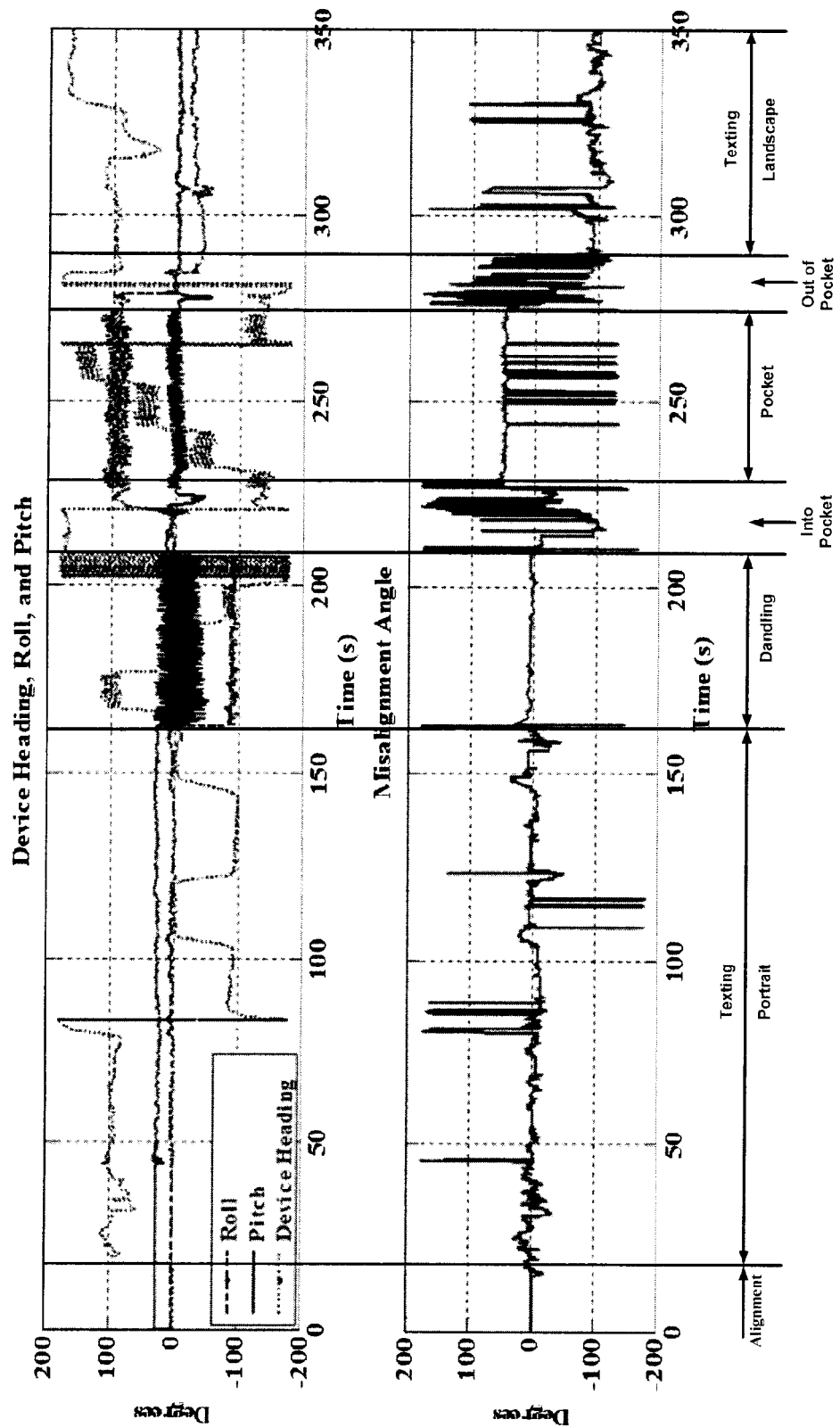
FIG. 8 shows the first trajectory results for device heading, roll, pitch, and misalignment with different device use cases.

FIG. 7 and FIG. 8 show results for the first trajectory. FIG. 7 shows the positioning results while FIG. 8 shows the device heading, roll, and pitch as well as the misalignment between the device and pedestrian. It has to be noted that because angles are cyclic, the values around 180 degrees can show on top and bottom of the graph (i.e. slightly less than 180 and slightly larger than −180 degrees) which cause them to show vertical lines in the graph between the 180 and −180 degrees. In this trajectory, the user started outdoor with GPS then went indoor in an office building and walked in two rectangles forming a shape of figure eight in corridors in the building then came out again. The user started with the phone handheld in texting portrait, then after going indoors he switched to dangling (with the speaker forward) and walked in the first rectangle to the right of the FIG. 7, then he put the device in trouser pocket (left pocket with screen inside and speaker pointing relatively towards the right but with a tilt because of the pocket) and performed the second rectangle to the left of the figure, then while going south in the last corridor before going out the user switched to texting landscape mode (with speaker pointing left), and at the end he went outside the building again with the phone still in the same texting landscape. FIG. 8 shows these different periods together with the attitude angles and the misalignment angle during each period. The two periods when the user was putting the phone in pocket and getting it out of pocket can also be seen in FIG. 8, as well as their small effect on the navigation solution can be seen in FIG. 7 in the middle North-to-South corridor when such transition in and out of pocket happens. The misalignment angle during the texting portrait was near 0 degrees, also during the dangling the misalignment was near 0 degrees, during the pocket the misalignment was about 50 degrees, and finally for the texting landscape the misalignment was between −90 degrees and −100 degrees. It has to be noted that in very few epochs (i.e. iteration, which is at the sampling rate of inertial sensors) the misalignment can bring instantaneous values erroneous by 180 degrees because the disambiguity method did take the wrong decision at these epochs. However the overall impact of these on the navigation solution is minor. The indoor duration was about 2 minutes, and the maximum positioning error was within 7 meters. The indoor part did not have any GPS and it did not have any other form of absolute navigational information, but it was a sensor only navigation utilizing the misalignment determination from the presented method. These results show how the present method can obtain a misalignment between device and pedestrian and how it can be used to enhance the sensor-only navigation solution.

Figure 9:
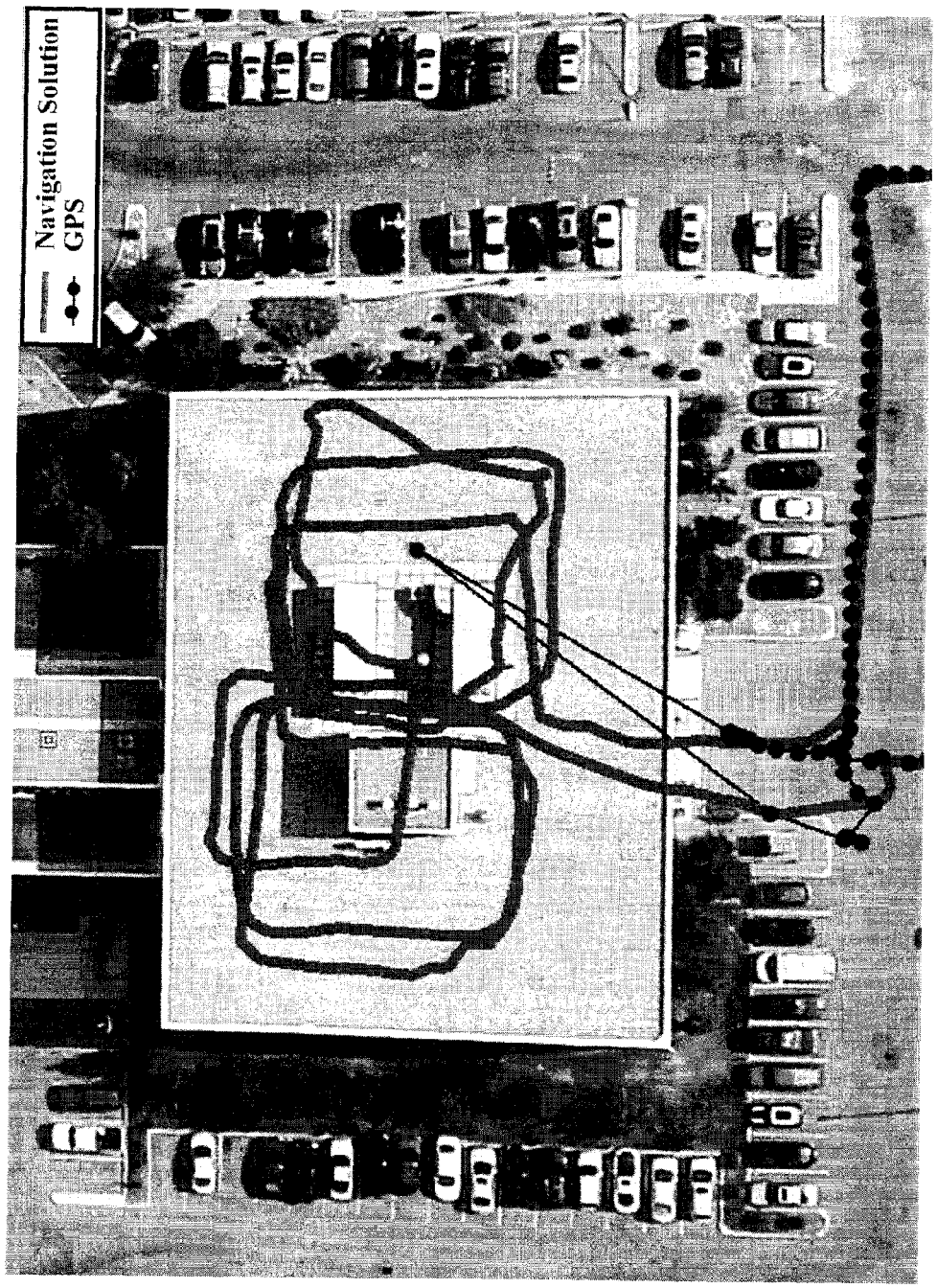
FIG. 9 shows the second trajectory positioning results with different device use cases and misalignments.
Figure 10:
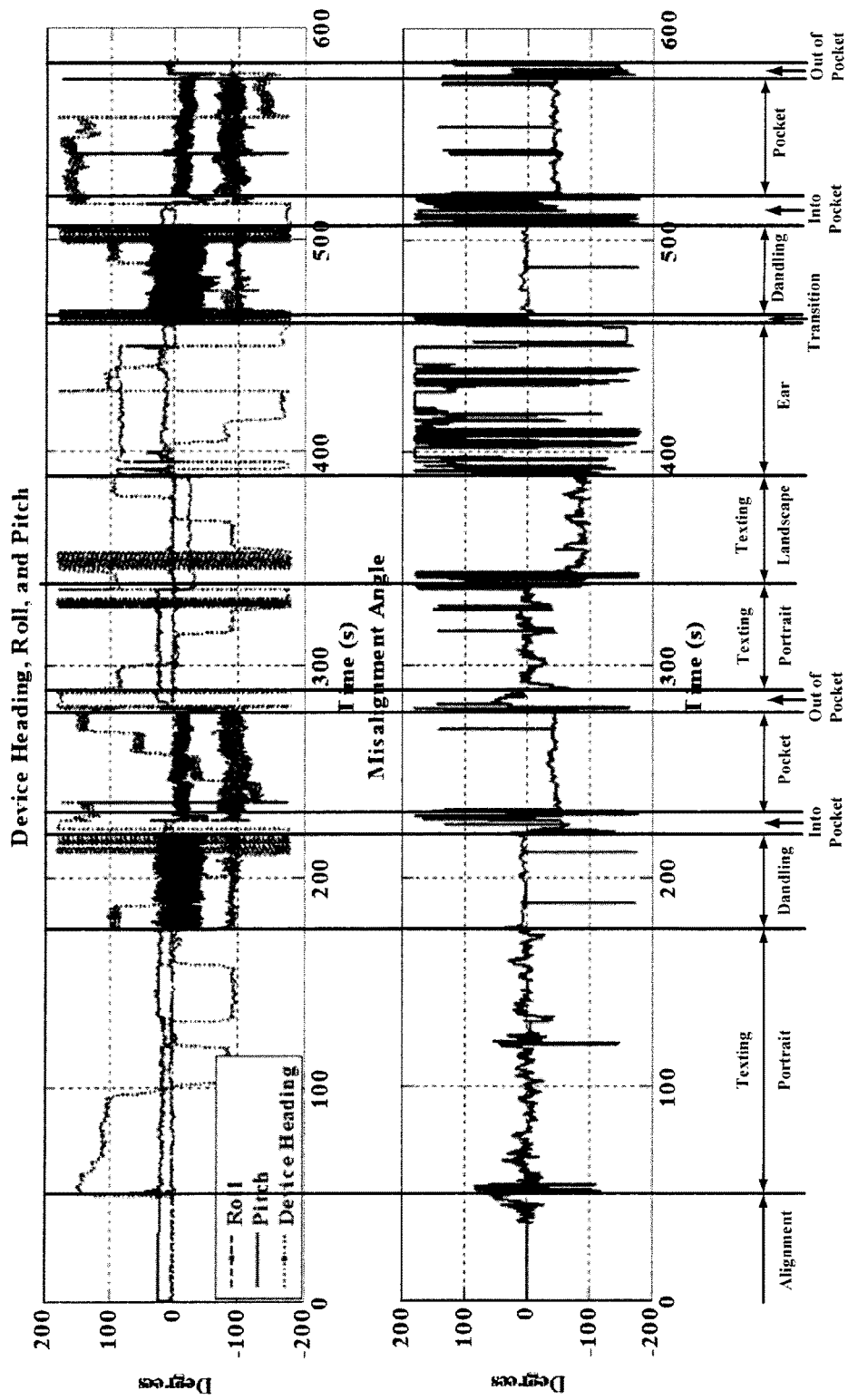
FIG. 10 shows the second trajectory results for device heading, roll, pitch, and misalignment with different device use cases.

FIG. 9 and FIG. 10 show results for the second trajectory. FIG. 9 shows the positioning results while FIG. 10 shows the device heading, roll, and pitch as well as the misalignment between the device and pedestrian. The same note in the previous trajectory about the angles being cyclic also causes the same effect in parts of FIG. 10. In this trajectory, the user started outdoor with GPS then went indoor in the same office building as the previous trajectory and walked in six rectangles in the same corridors in the building then came out again, so the user walked on the same figure eight like the previous trajectory but three times on top of itself. The user started with the phone handheld in texting portrait, then after going indoors he switched to dangling (with the speaker forward) and walked in the first rectangle, then he put the device in trouser pocket (right pocket with screen inside and speaker pointing relatively towards the left but with a tilt because of the pocket) and performed the second rectangle, then he took the phone out of pocket and used it in texting portrait mode for the third rectangle, followed by texting landscape (with speaker pointing left) for the fourth rectangle, followed by ear (device on right ear and speaker near backward) for the fifth loop, the sixth loop the user did dangling again (with the speaker forward), then while going south in the last corridor before going out the user switched to trouser pocket (right pocket with screen inside and speaker pointing relatively towards the left but with a tilt because of the pocket), and at the end he went outside the building again with the phone still in pocket. FIG. 10 shows these different periods together with the attitude angles and the misalignment angle during each period. The periods when the user was putting the phone in pocket and getting it out of pocket can also be seen in FIG. 10, as well as their small effect on the navigation solution can be seen in FIG. 9 in the middle North-to-South corridor when such transition in and out of pocket happens (some of such transitions took more time than others especially the last one indoors when putting it inside pocket). The misalignment angle during the texting portrait was near 0 degrees, also during the dangling the misalignment was near 0 degrees, during the pocket the misalignment was between −45 to −50 degrees, during texting portrait the misalignment was around 0 again, during texting landscape the misalignment was about −90 degrees, during ear the misalignment was around 180 degrees, during dangling it was around 0 degrees, and finally for the pocket the misalignment was between −45 degrees and −50 degrees. As noted in the first trajectory, in very few epochs (i.e. iteration, which is at the sampling rate of inertial sensors) the misalignment can bring instantaneous values erroneous by 180 degrees because the disambiguity method did take the wrong decision at these epochs. However, as mentioned earlier, the overall impact of these on the navigation solution is minor. The indoor duration was slightly above 6 minutes, and the maximum positioning error was within 9 meters. The indoor part did not have GPS and it did not have any other form of absolute navigational information, but it was a sensor only navigation utilizing the misalignment determination from the presented method. These results show how the present method can obtain a misalignment between device and pedestrian and how it can be used to enhance the sensor-only navigation solution.

Example 3—Results for Walking with a Smartphone

In this example, there are three trajectories to present the performance of misalignment estimation technique with a Smartphone. The trajectories cover different phone use cases with different misalignment angles.

Figure 11:
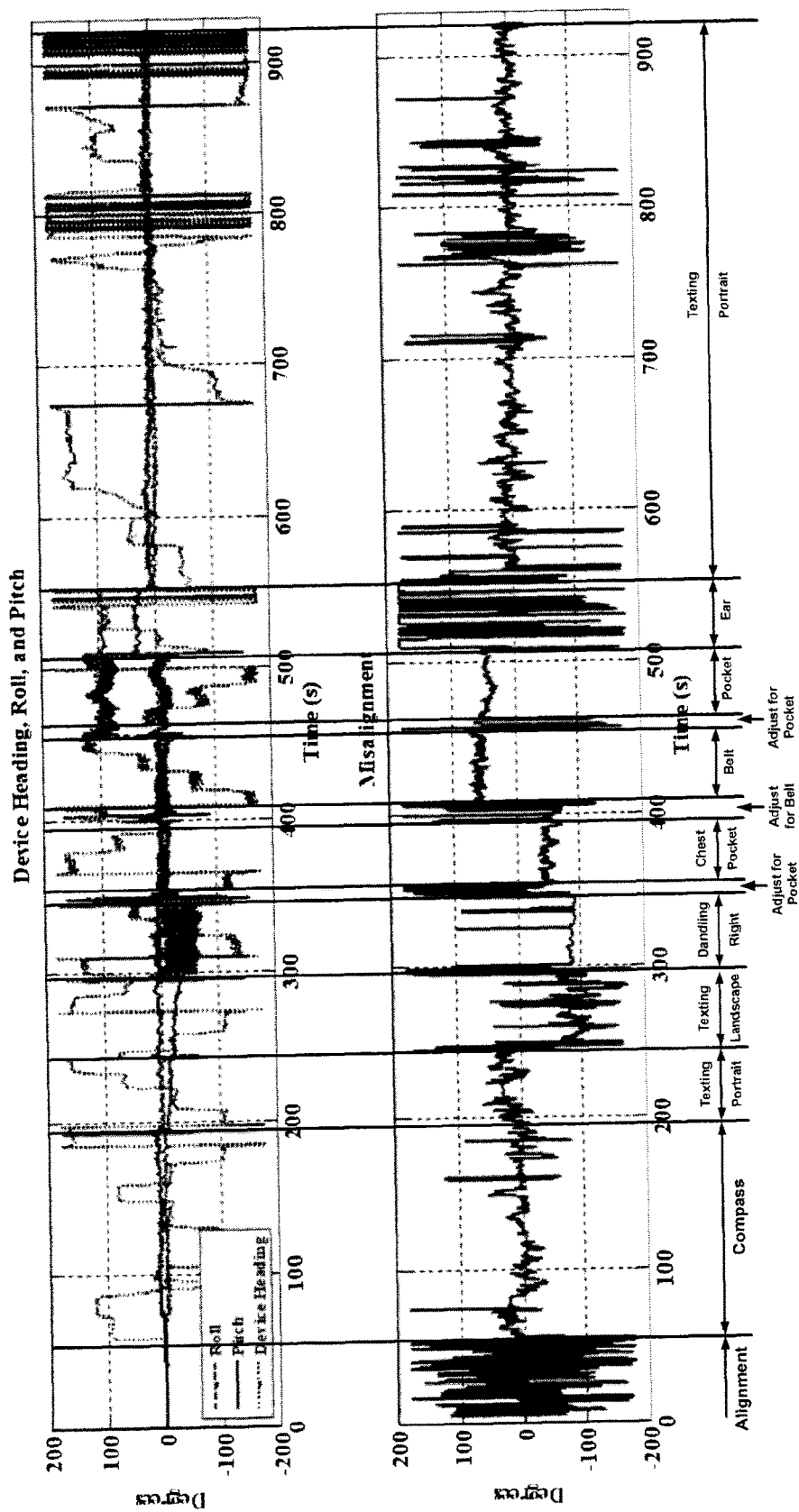
FIG. 11 shows the third trajectory results for device heading, roll, pitch, and misalignment with different device use cases.

FIG. 11 shows results for the third trajectory. FIG. 11 shows the device heading, roll, and pitch as well as the misalignment between a Smartphone and pedestrian. This trajectory shows different phone use cases such as compass, texting portrait and landscape, dangling, trouser pocket, belt clip, ear talking, and chest pocket. In this trajectory, the user started outdoor with GPS then went indoor in the same office building and switched between the different use cases while walking indoors then came out again. The user started outdoors with the phone handheld in compass use case, where the roll and pitch angles are almost around zero and the device is in the horizontal plane. The phone is used in different ways during the test. For example, it is moved from compass use case, with roll and pitch angles at almost zero, to texting portrait followed by texting landscape with roll angle around 45 degrees and pitch angle of almost zero degrees as shown in FIG. 11. The user changed the use case into dangling use case. Then, the phone is placed in the chest pocket and next in the belt clip with a pitch of 90 degrees. The test shows different activities while the user is carrying the phone in his/her pocket or taking a call during the test. FIG. 11 shows these different periods together with the attitude angles and the misalignment angle during each period. The periods when the user was adjusting the device in pocket and getting it out of pocket or adjusting it for belt clip and getting it out of belt clip can also be seen in FIG. 11. The misalignment angle during the compass and texting portrait was near 0 degrees, during the texting landscape and dangling the misalignment was near −90 degrees, during the pocket and chest pocket the misalignment was between 45 to 50 degrees, during the ear talking the misalignment was close to 180 degrees, and finally for the texting portrait the misalignment was around 0 again with some epochs giving the wrong estimation misalignment value due to the user opening two consecutive doors to get out of the building. As noted in the previous trajectories, in very few epochs (i.e. iteration, which is at the sampling rate of inertial sensors) the misalignment can bring instantaneous values erroneous by 180 degrees because the disambiguity method did take the wrong decision at these epochs. However, as mentioned earlier, the overall impact of these on the navigation solution is minor. The indoor duration was slightly above 9 minutes with sensor only navigation utilizing the misalignment determination from the presented method.

Figure 12:
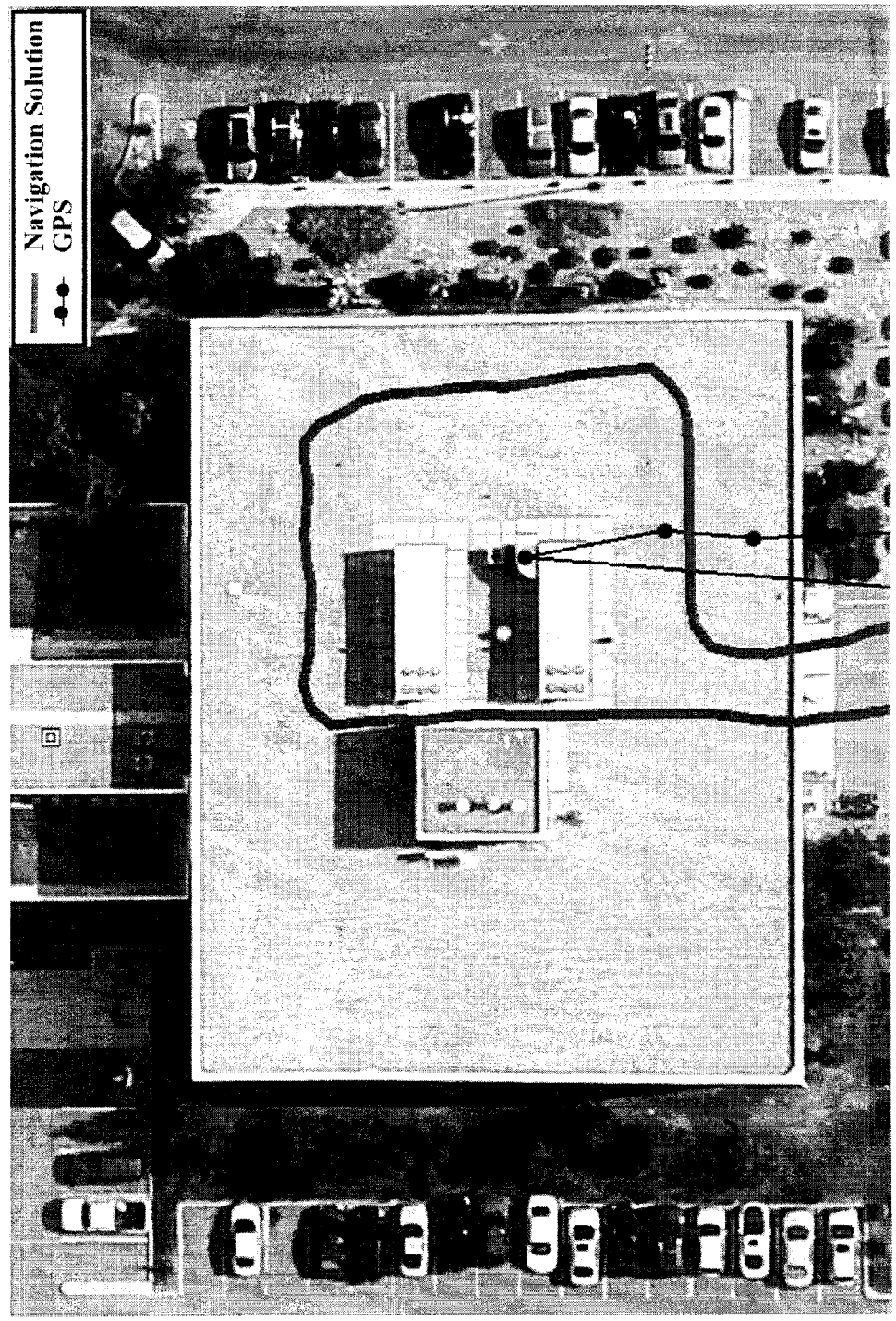
FIG. 12 Fourth Trajectory positioning results with different device use cases and misalignments.
Figure 13:
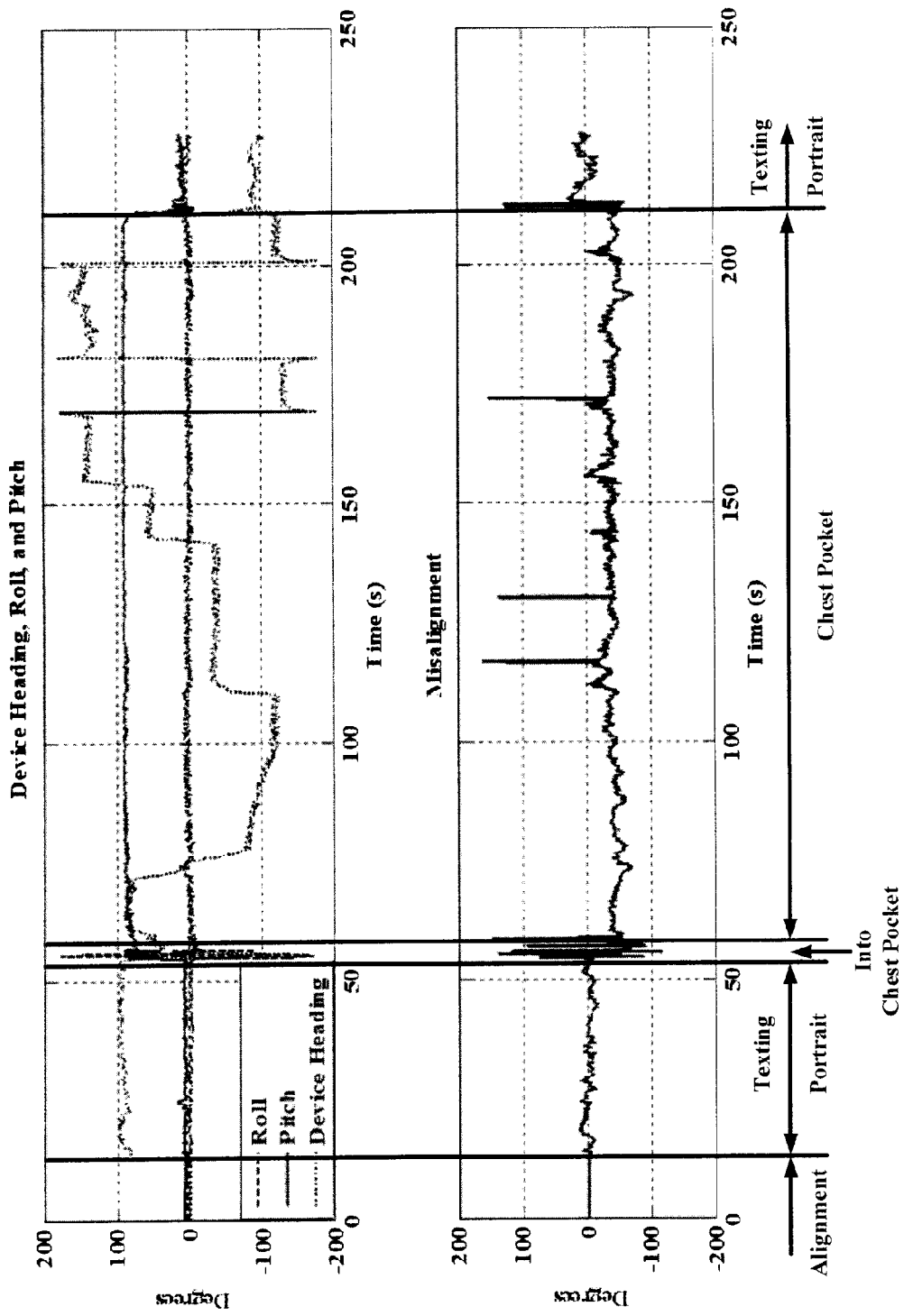
FIG. 13 Fourth Trajectory results for device heading, roll, pitch, and misalignment with different device use cases.

FIG. 12 and FIG. 13 show results for the fourth trajectory. FIG. 12 shows the positioning results while FIG. 13 shows the device heading, roll, and pitch as well as the misalignment between the device and pedestrian. This trajectory shows the performance of the misalignment technique when the phone was placed in chest pocket. In this trajectory, the user started outdoor with GPS then went indoor in the same office building as the previous trajectories and walked in one rectangle in the same corridors in the building then came out again, so the user walked on one side of the figure eight. The user started with the phone handheld in texting portrait, then before going indoors the user put the phone in the chest pocket and walked in one rectangle and at the end went outside the building again with the phone in texting portrait use case. FIG. 13 shows these different periods together with the attitude angles and the misalignment angle during each period. The periods when the user was putting the phone in the chest pocket can also be seen in FIG. 13, as well as their small effect on the navigation solution can be seen in FIG. 12. FIG. 13 shows that the pitch angle was changed from 0 to 90 degrees as the device orientation changed from texting portrait to chest pocket, and changed from 90 to 0 degrees when the phone moved again into texting portrait mode. The misalignment angle during the texting portrait was near 0 degrees, during the chest pocket the misalignment was around −50 degrees, and finally for the texting portrait the misalignment was around 0 again. The trajectory has minor epochs (i.e. iteration, which is at the sampling rate of inertial sensors) where the misalignment can bring instantaneous values erroneous by 180 degrees because the disambiguity method did take the wrong decision at these epochs. However, as mentioned earlier, the overall impact of these on the navigation solution is minor. The indoor duration was slightly above 1.5 minutes, and the maximum positioning error was within 6 meters. The indoor part did not have GPS and it did not have any other form of absolute navigational information, but it was a sensor only navigation utilizing the misalignment determination from the presented method.

Figure 14:
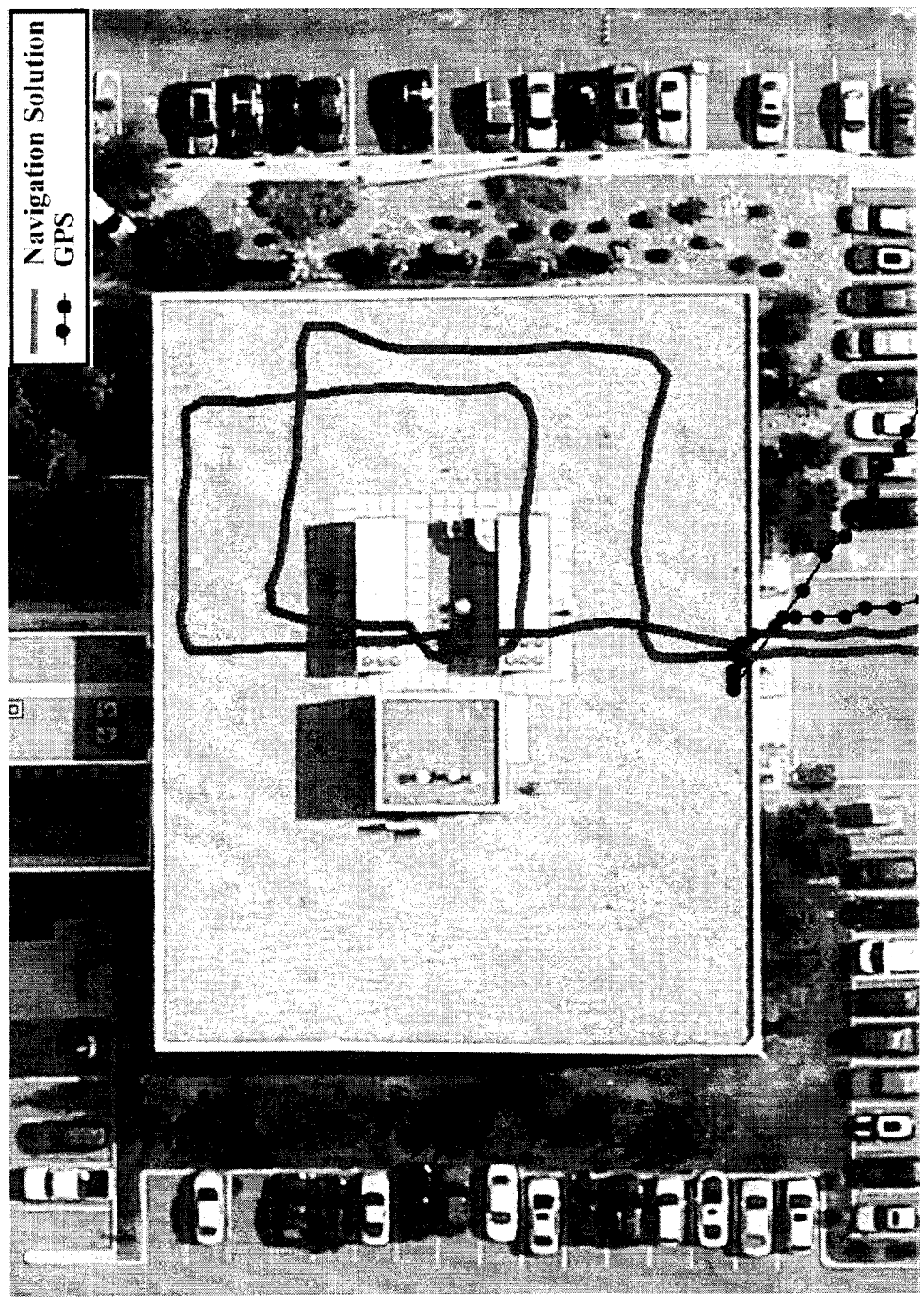
FIG. 14 Fifth Trajectory positioning results with different device use cases and misalignments.
Figure 15:
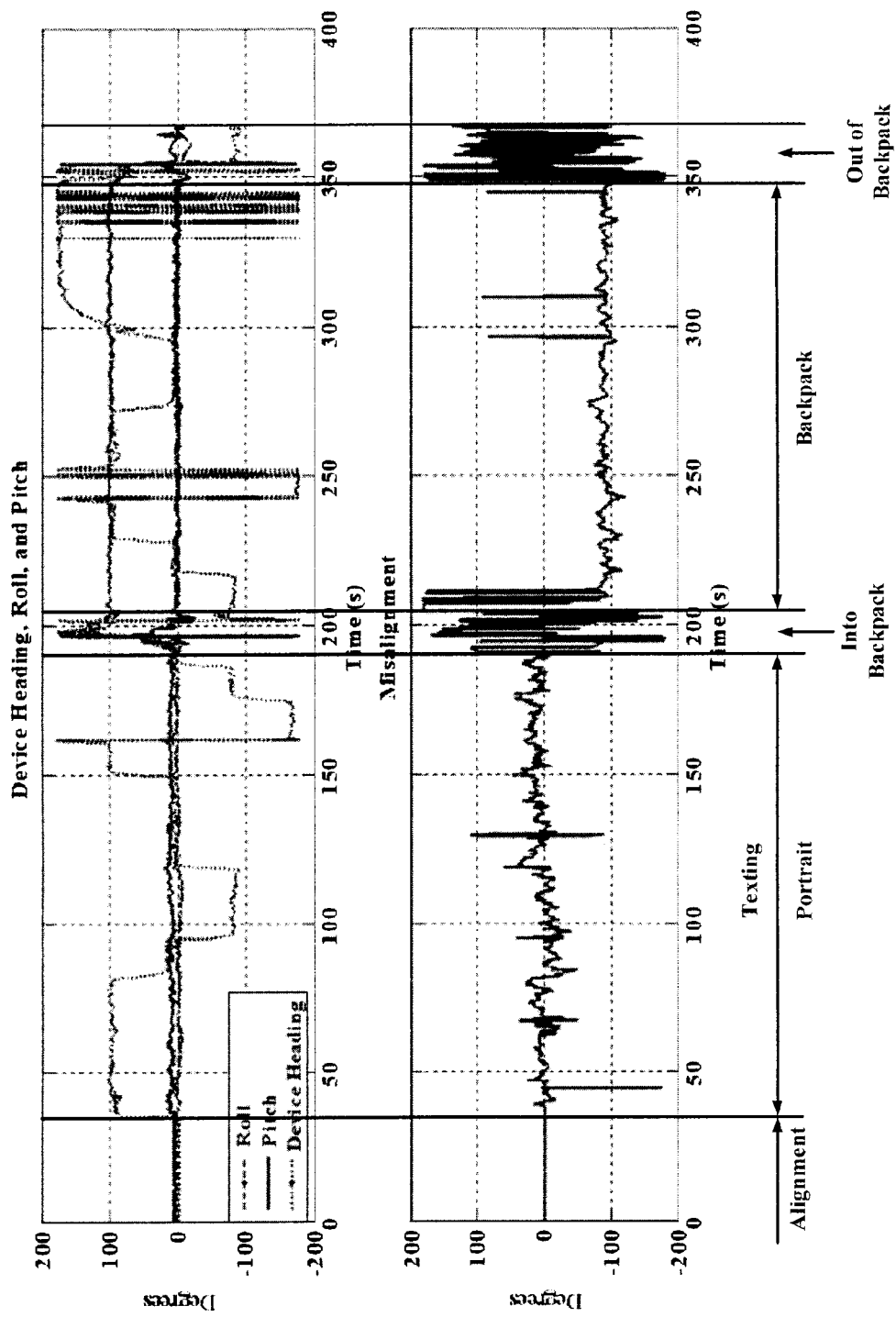
FIG. 15 Fifth Trajectory results for device heading, roll, pitch, and misalignment with different device use cases.

FIG. 14 and FIG. 15 show results for the fifth trajectory. FIG. 14 shows the positioning results while FIG. 15 shows the device heading, roll, and pitch as well as the misalignment between the device and pedestrian. This trajectory shows the performance of the misalignment technique when the phone was placed in the user backpack. In this trajectory, the user started outdoor with GPS then went indoor in the same office building as the previous trajectories and walked in two rectangles in the same corridors in the building then came out again, so the user walked on one side of the figure eight. The user started with the phone handheld in texting portrait and entered the building and walked in one rectangle inside the building, then before starting the second rectangle the user put the device in the backpack and walked in another rectangle and at the end he went outside the building with the device still in the backpack. FIG. 15 shows these different periods together with the attitude angles and the misalignment angle during each period. The periods when the user was putting the phone in the backpack and getting it out of the backpack can also be seen in FIG. 15, as well as their effect on the navigation solution can be seen in FIG. 14. The misalignment angle changed from 0 degree to −90 degree with roll angle changed from 0 to 90 degrees when the phone was placed in the backpack. The misalignment angle during the texting portrait was near 0 degrees, and finally during carrying in the backpack the misalignment was around −95 degrees. The trajectory has minor epochs where the misalignment can bring instantaneous values erroneous by 180 degrees because the disambiguity method did take the wrong decision at these epochs. However, as mentioned earlier, the overall impact of these on the navigation solution is minor. The indoor duration was slightly above 3 minutes, and the maximum positioning error was within 7 meters in the deep indoor navigation. The indoor part did not have GPS and it did not have any other form of absolute navigational information, but it was a sensor only navigation utilizing the misalignment determination from the presented method.

Example 4—Results for Walking with a Tablet

The current example presents two trajectories to show the performance of misalignment estimation technique with a tablet. The trajectories cover different tablet use cases with different misalignment angles.

Please note that for tablet the definition of portrait and landscape is different from phone. For tablet, landscape has a misalignment of 0 degrees instead of the ±90 degrees for phone. Portrait in tablet has a misalignment of either 90 or −90 degrees instead of 0 degrees for phone.

Figure 16:
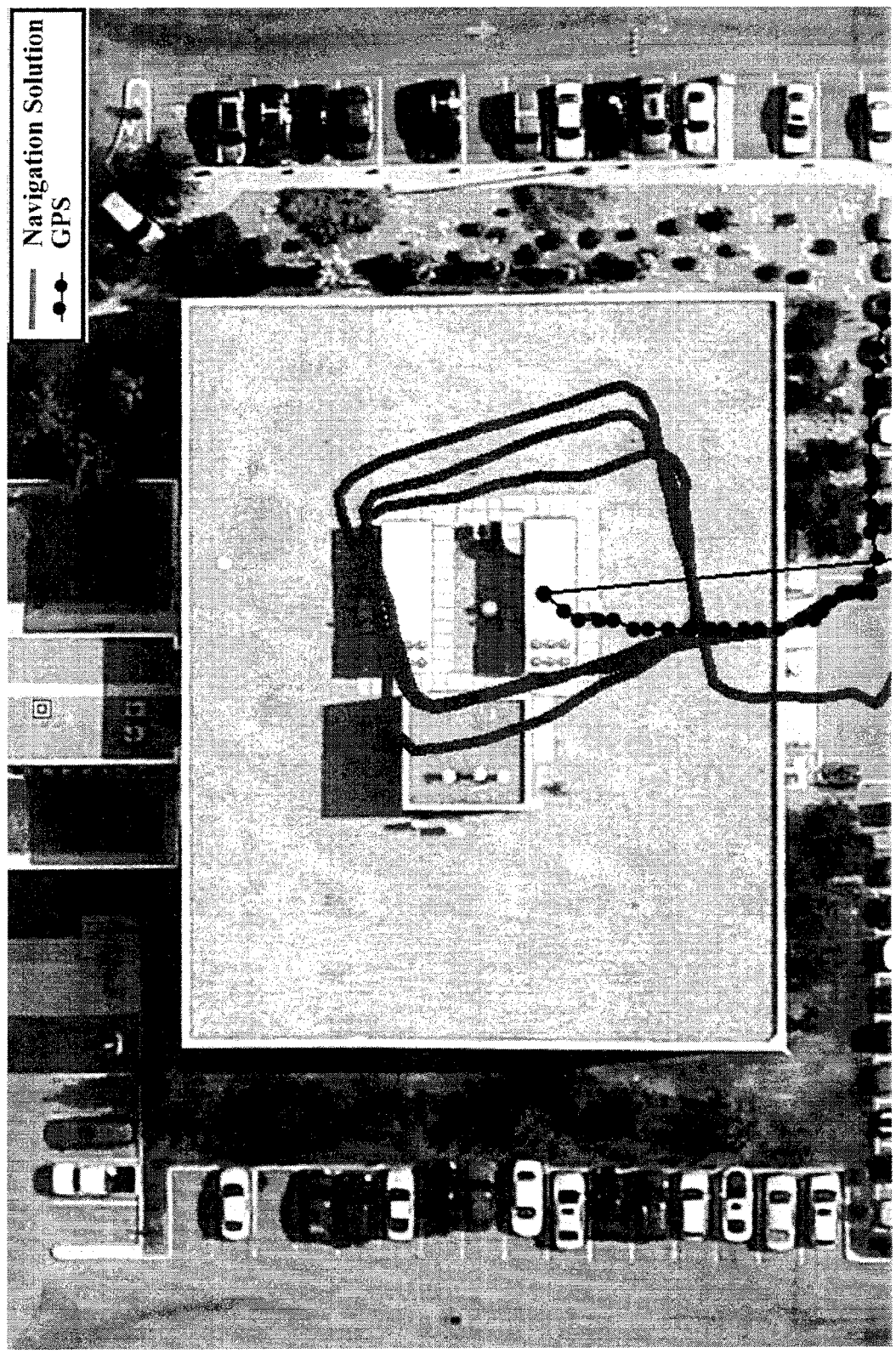
FIG. 16 Sixth Trajectory positioning results with different tablet use cases and misalignments.
Figure 17:
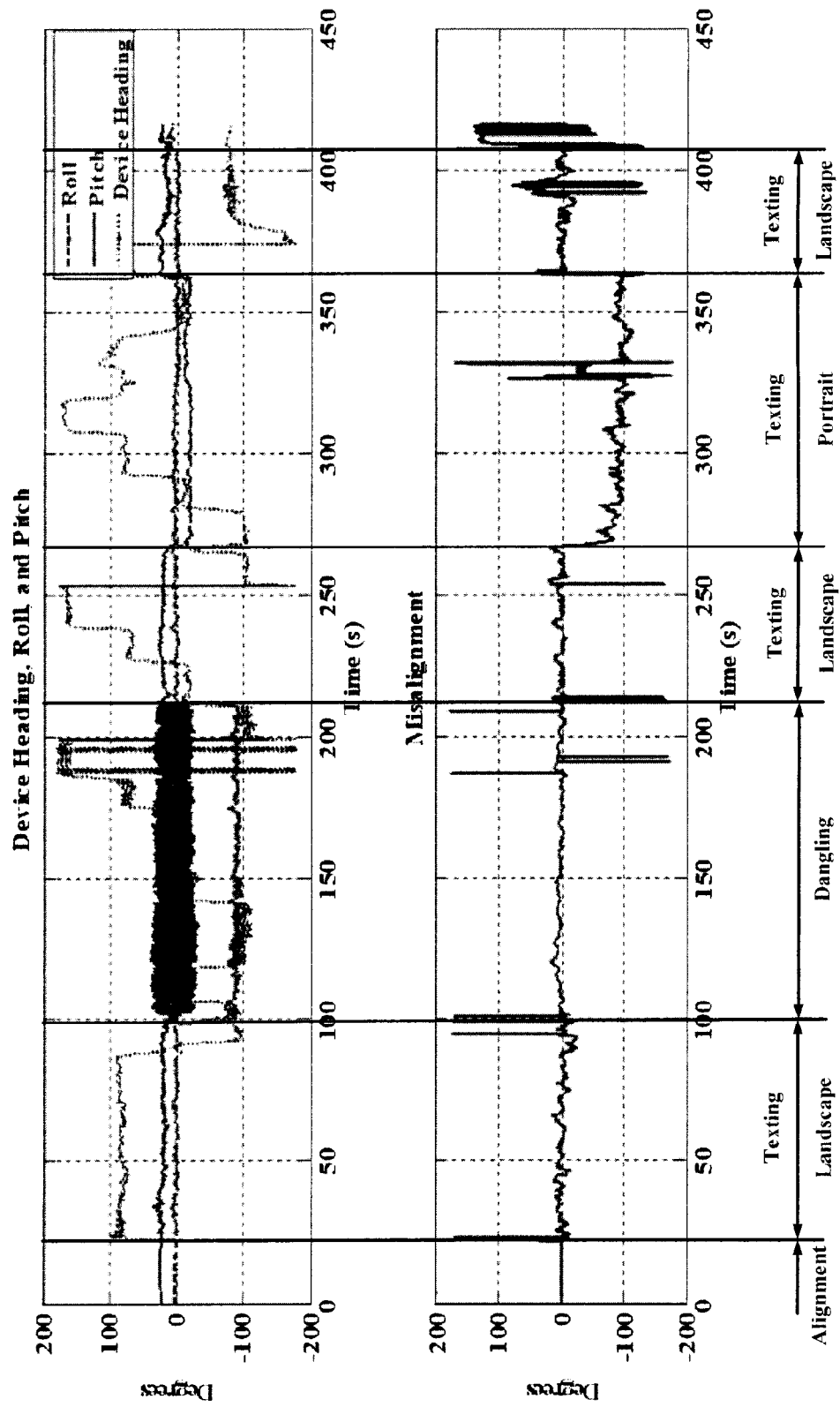
FIG. 17 Sixth Trajectory results for device heading, roll, pitch, and misalignment with different tablet use cases.

FIG. 16 and FIG. 17 show results for the sixth trajectory. FIG. 16 shows the positioning results while FIG. 17 shows the device heading, roll, and pitch as well as the misalignment between the device and pedestrian. This trajectory shows the performance of the misalignment technique when the tablet was used in different use cases. In this trajectory, the user started outdoor with GPS then went indoor in the same office building as the previous trajectories and walked in three rectangles in the same corridors in the building then came out again, so the user walked on one side of the figure eight. The user started with the tablet handheld in texting landscape then switched to dangling outdoor and entered the building with dangling and walked in one rectangle inside the building, second rectangle the user switched to texting landscape and during the last rectangle the user change the device orientation into texting portrait and went outside the building and finally changed the device into texting landscape again. FIG. 17 shows these different periods together with the attitude angles and the misalignment angle during each period. The misalignment angle during the texting landscape was near 0 degrees, during the dangling was also near 0 degrees, during texting landscape was 0 degrees, during the texting portrait was near −90 degrees, and finally during the texting landscape was near 0 again. This trajectory has minor epochs where the misalignment can bring instantaneous values erroneous by 180 degrees because the disambiguity method did take the wrong decision at these epochs. However, as mentioned earlier, the overall impact of these on the navigation solution is minor. The indoor duration was slightly above 4 minutes, and the maximum positioning error was within 8.5 meters in the deep indoor navigation. The indoor part did not have GPS and it did not have any other form of absolute navigational information, but it was a sensor only navigation utilizing the misalignment determination from the presented method.

Figure 18:
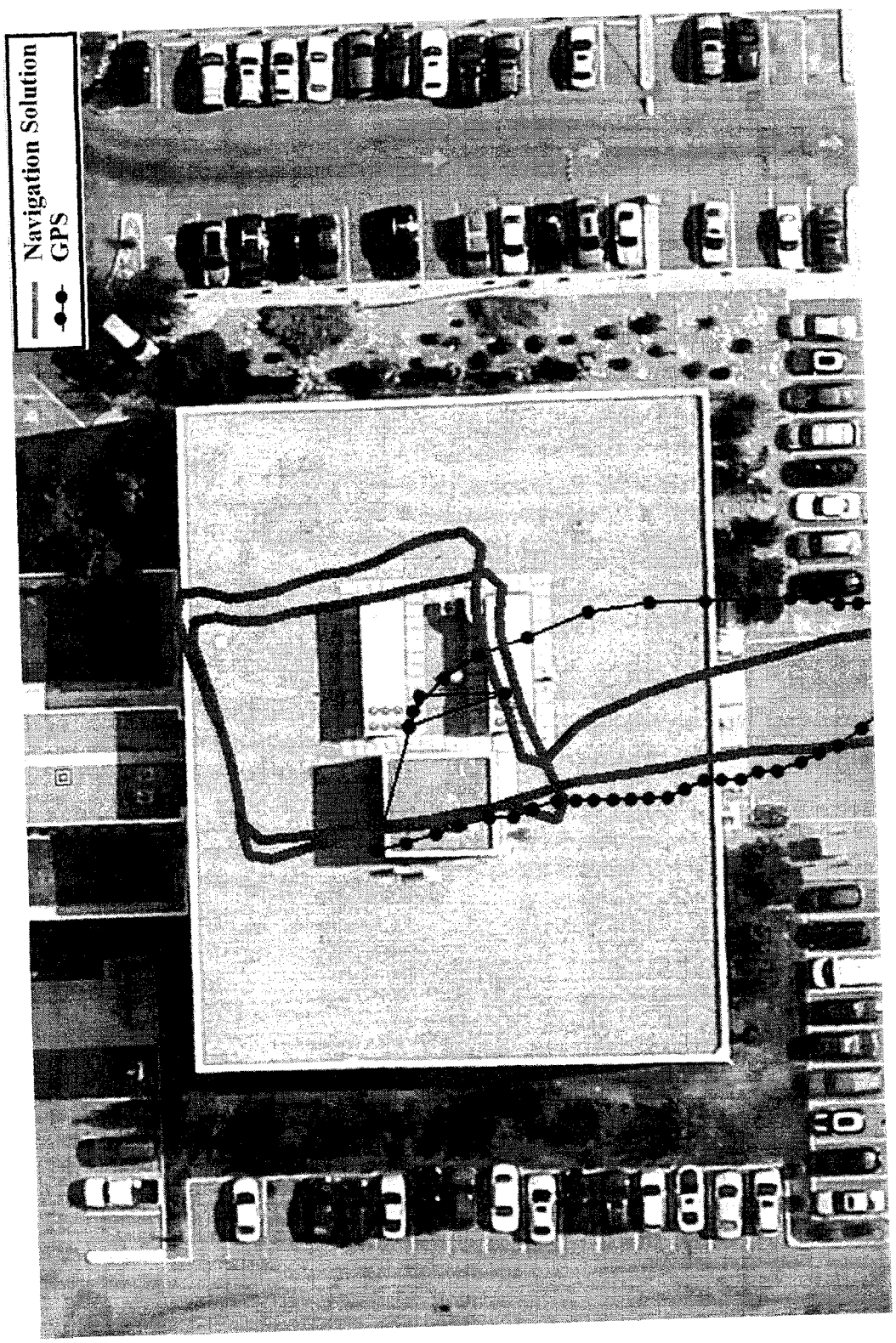
FIG. 18 Seventh Trajectory positioning results with different tablet use cases and misalignments.
Figure 19:
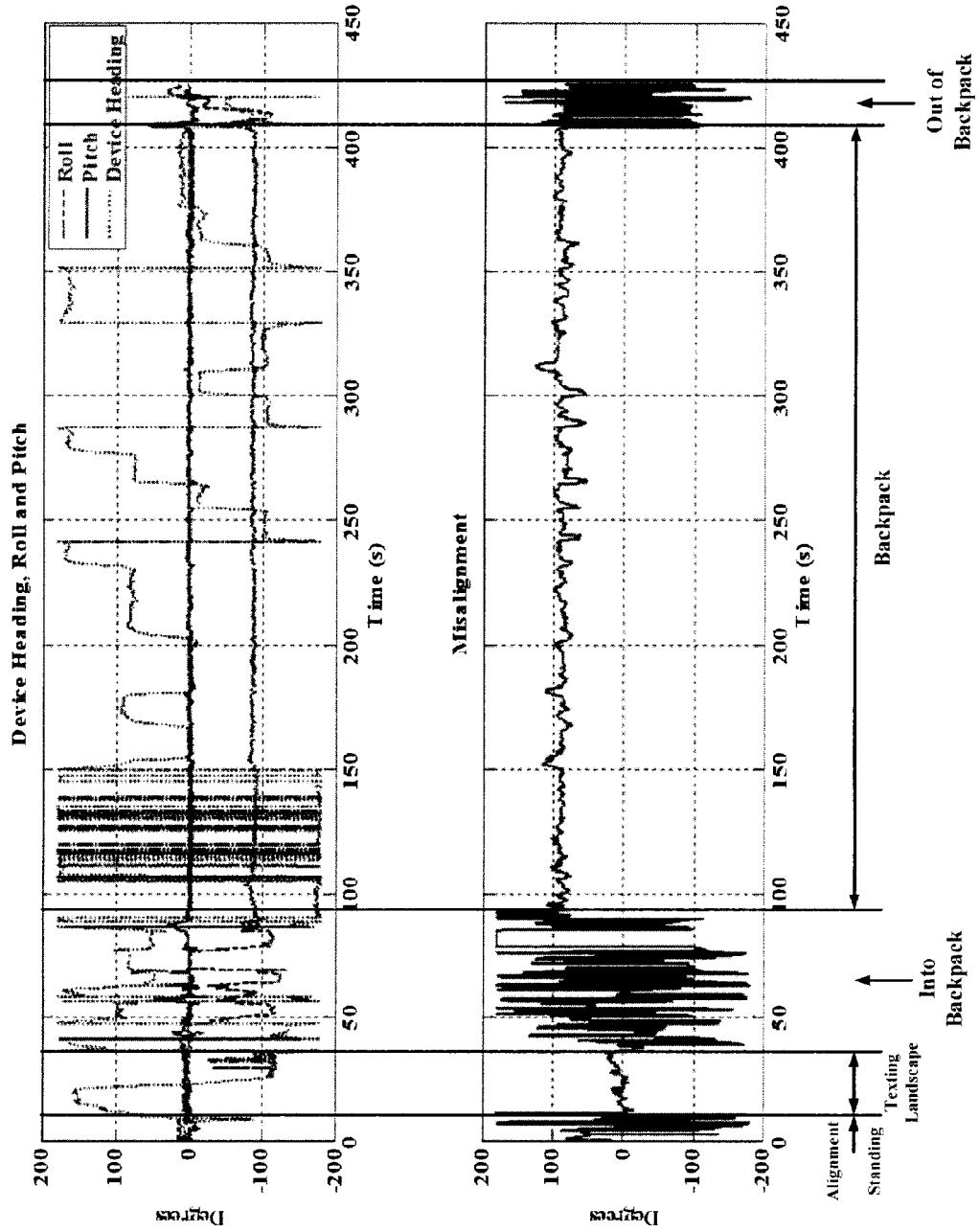
FIG. 19 Seventh Trajectory results for device heading, roll, pitch, and misalignment with different tablet use cases.

FIG. 18 and FIG. 19 show results for the seventh trajectory. FIG. 18 shows the positioning results while FIG. 19 shows the device heading, roll, and pitch as well as the misalignment between the device and pedestrian. This trajectory shows the performance of the misalignment technique when the tablet was placed in the user backpack. In this trajectory, the user started outdoor with GPS then went indoor in the same office building as the previous trajectories and walked in two rectangles in the same corridors in the building then came out again, so the user walked on one side of the figure eight. The user started with the tablet handheld in texting landscape then moved into the user backpack outside the building and entered the building with the tablet in the backpack and walked in two rectangles inside the building, and went outside the building having tablet in the backpack. FIG. 17 shows these different periods together with the attitude angles and the misalignment angle during each period. The misalignment angle during the texting landscape was near 0 degrees, during the dangling was also near 0 degrees, during texting portrait was 0 degrees, and finally during the backpack was near 90 degrees. The indoor duration was slightly above 2 minutes, and the maximum positioning error was within 10 meters. The indoor part did not have GPS and it did not have any other form of absolute navigational information, but it was a sensor only navigation utilizing the misalignment determination from the presented method.

Example 5—Results for Walking with a Watch

One trajectory is presented to illustrate the performance of the misalignment estimation technique with a Smartwatch. The trajectories cover different Smartwatch use cases with different misalignment angles. Please note that for Smartwatch, the viewing use case refers to watching the time.

Figure 20:
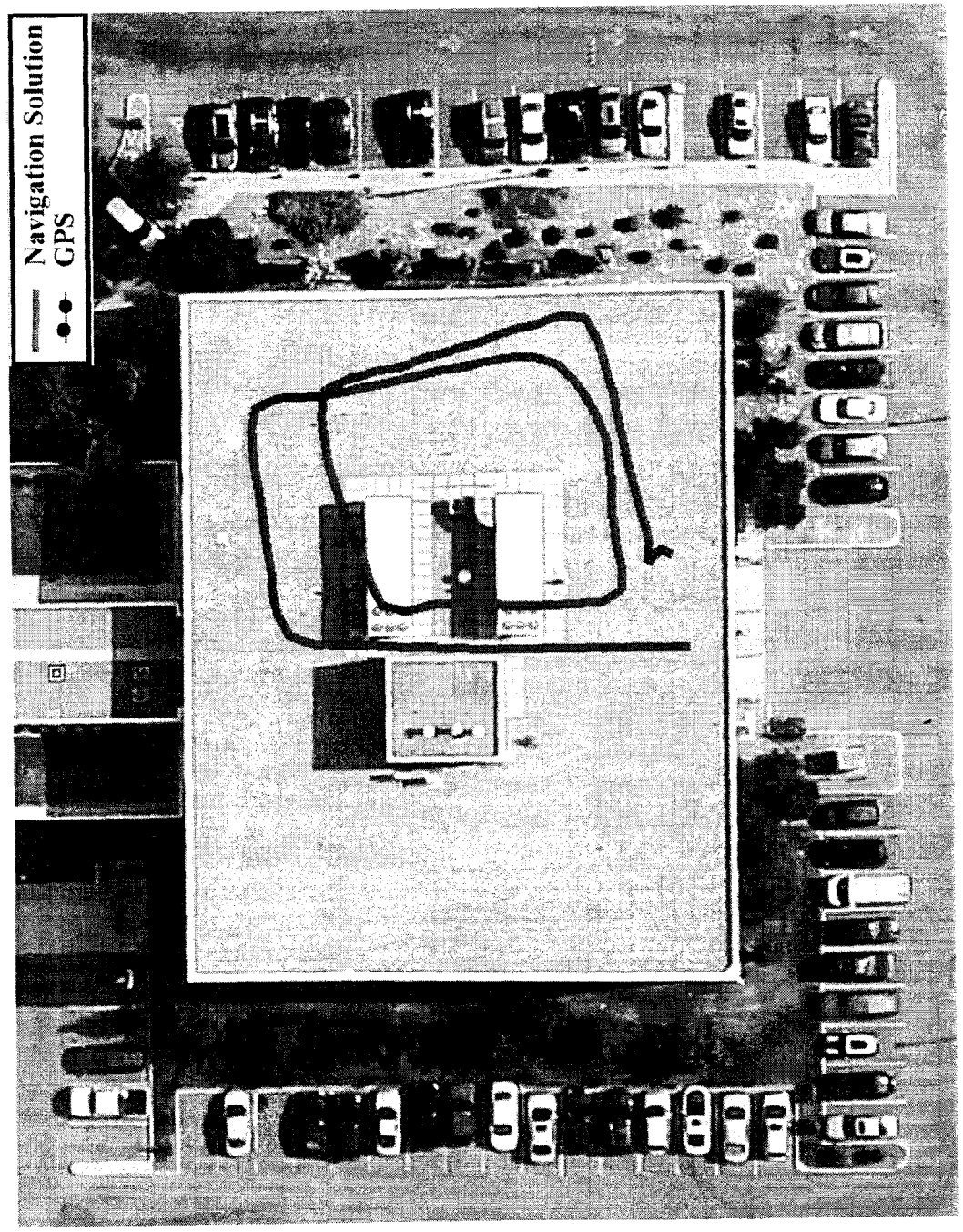
FIG. 20 Eighth Trajectory positioning results with different Watch use cases and misalignments.
Figure 21:
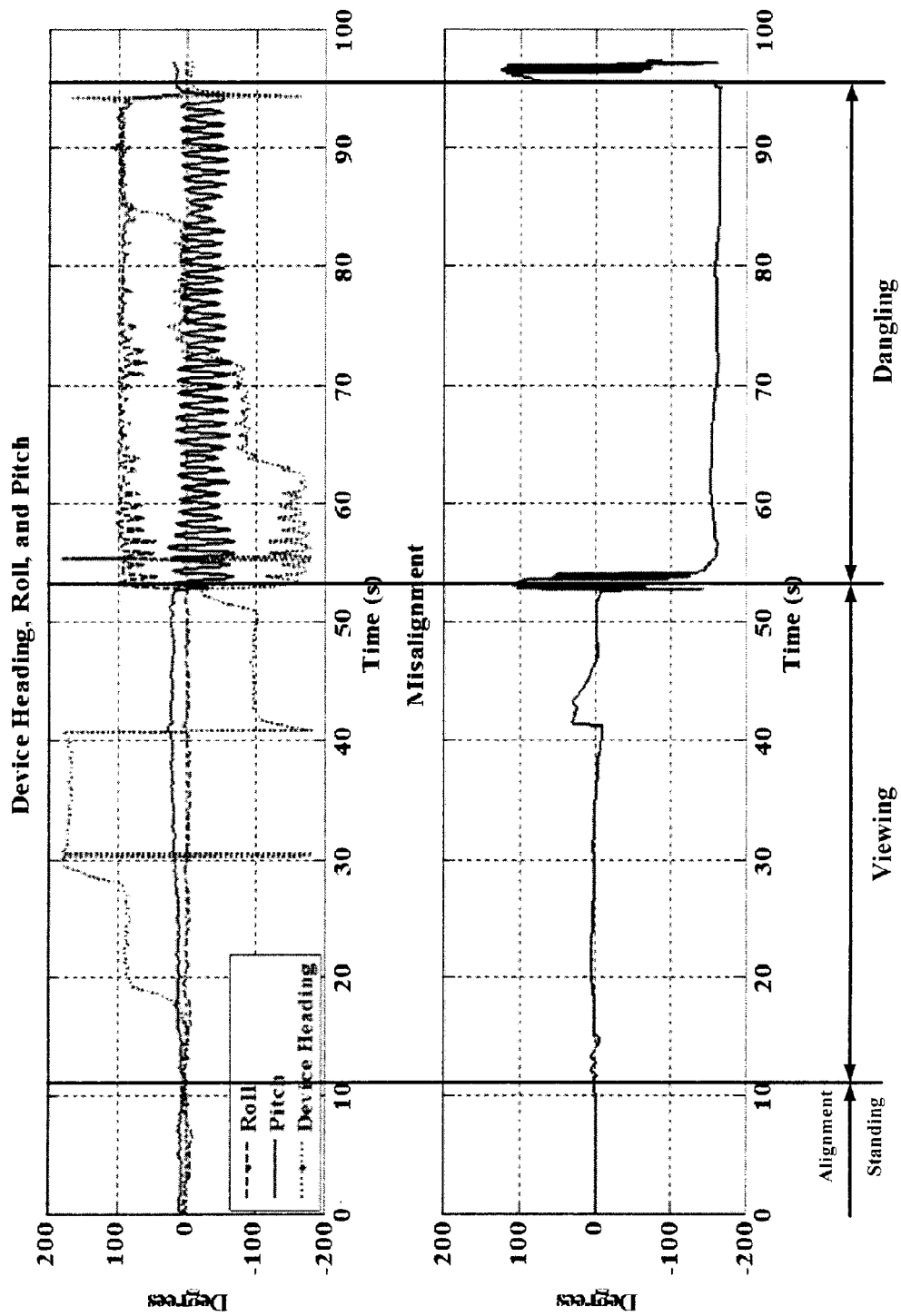
FIG. 21 Eighth Trajectory results for device heading, roll, pitch, and misalignment with different Watch use cases.

FIG. 20 and FIG. 21 show results for the eighth trajectory. FIG. 20 shows the positioning results while FIG. 21 shows the device heading, roll, and pitch as well as the misalignment between the device and pedestrian. This trajectory shows the performance of the misalignment technique when the Watch was held in the left hand of the user. In this trajectory, the user started indoor without GPS and walked in two rectangles in the same corridors in the building then stopped, so the user walked on one side of the figure eight. The user started with the Watch in viewing (checking the time) then moved into normal walking with dangling. FIG. 21 shows these different periods together with the attitude angles and the misalignment angle during each period. The misalignment angle during the viewing was near 0 degrees and during the dangling was near −170 degrees. The test duration was slightly around 1.5 minutes, and the maximum positioning error was within 5 meters. During the test there is no access for GPS or any other form of absolute navigational information, but it was a sensor only navigation utilizing the misalignment determination from the presented method.

Example 6—Results for Running with a Smartphones

The following example gives three trajectories to present the performance of the misalignment estimation technique with a Smartphone use cases during running. The trajectories cover different running phone use cases with different misalignment angles.

Figure 22:
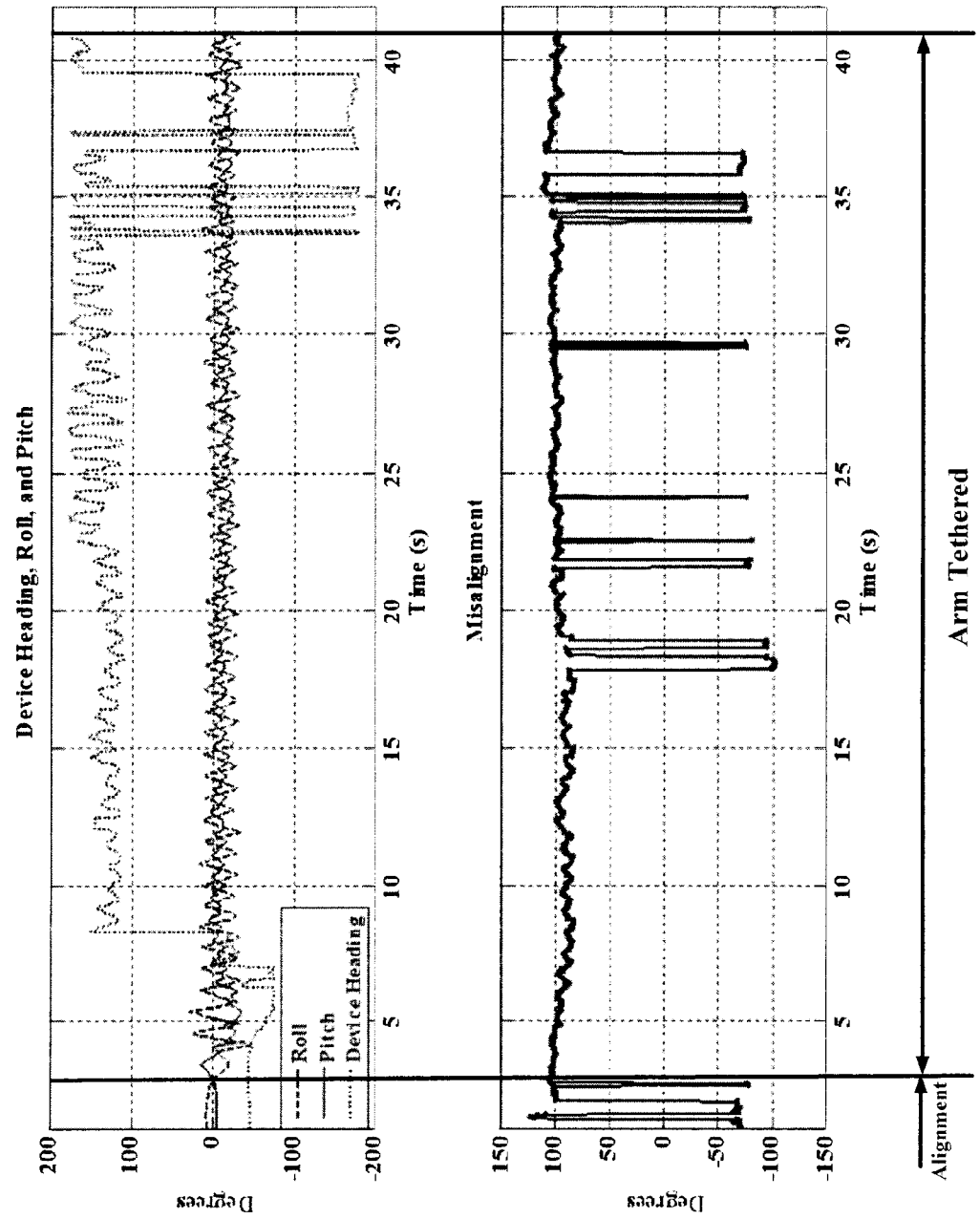
FIG. 22 Ninth Trajectory results for device heading, roll, pitch, and misalignment with arm tethered device use case during running.

FIG. 22 shows results for the ninth trajectory. FIG. 22 shows the device heading, roll, and pitch as well as the misalignment between a device and pedestrian during running. The trajectory shows arm phone tethered use cases while the user was running in a straight line which can be seen in FIG. 22 as the heading is fixed during the trajectory. During the trajectory, the user fixed the phone to his/her left arm with screen faces out of the body and the speaker pointed up. The trajectory shows the running activity while the user is fixing the phone into his/her left arm. FIG. 22 shows this period together with the attitude angles and the misalignment during the period. The misalignment angle during the trajectory was near 95 degrees. As noted in the previous trajectories, in few epochs the misalignment can bring instantaneous values erroneous by 180 degrees because the disambiguity method did take the wrong decision at these epochs.

Figure 23:
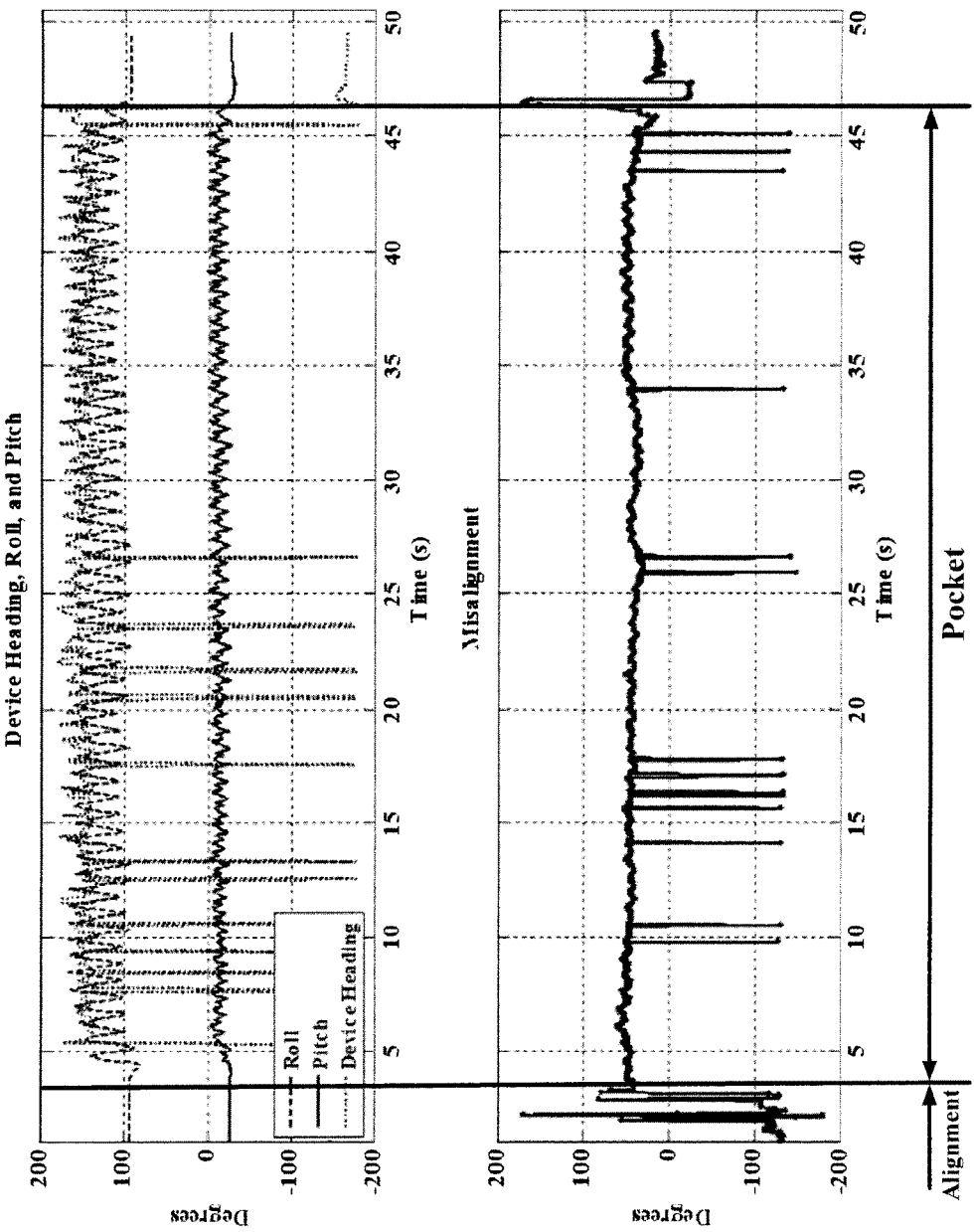
FIG. 23 Tenth Trajectory results for device heading, roll, pitch, and misalignment with device in pocket use case during running.

FIG. 23 shows results for the tenth trajectory. FIG. 23 shows the device heading, roll, and pitch as well as the misalignment between a device and pedestrian during running. The trajectory shows the phone pocket use case while the user was running in a straight line which can be seen in FIG. 23 as the heading is fixed during the trajectory. During the trajectory, the user put the phone in his/her pocket with screen faces into user body and the speaker pointed up. The trajectory shows the running activity while the user has the phone in his/her right trouser pant pocket. FIG. 23 shows this period together with the attitude angles and the misalignment during the period. The misalignment angle during the trajectory was near 40 degrees. As noted in the previous trajectories, in few epochs the misalignment can bring instantaneous values erroneous by 180 degrees because the disambiguity method did take the wrong decision at these epochs.

Figure 24:
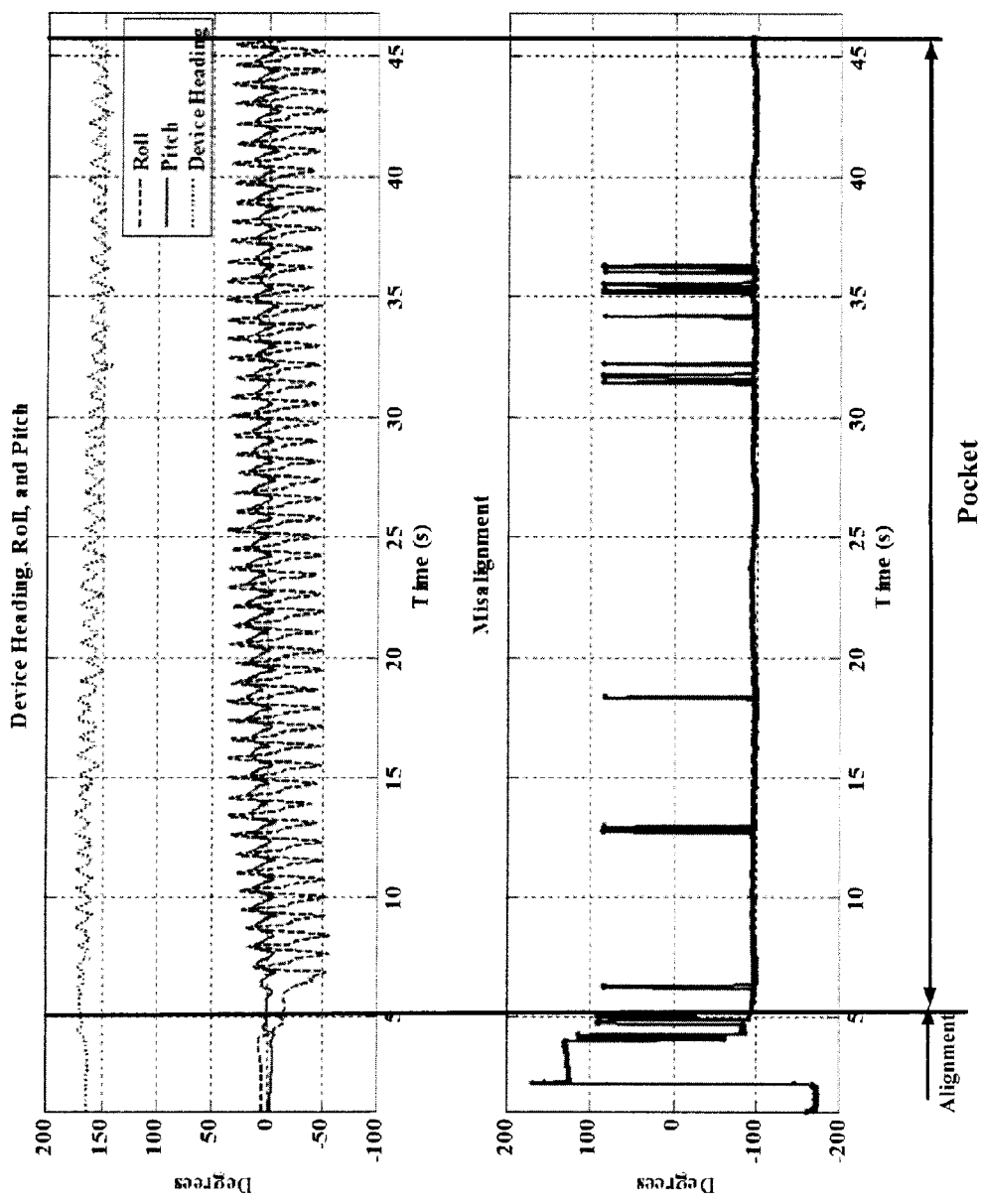
FIG. 24 Eleventh Trajectory results for device heading, roll, pitch, and misalignment with leg tethered device use case during running.

FIG. 24 shows results for the eleventh trajectory. FIG. 24 shows the device heading, roll, and pitch as well as the misalignment between a device and pedestrian during running. The trajectory shows leg phone tethered use cases while the user was running in a straight line which can be seen in FIG. 24 as the heading is fixed during the trajectory. During the trajectory, the user fixed the phone to his/her right leg with screen faces out of the body and the speaker pointed up. The trajectory shows the running activity while the user is fixing the phone into his/her right leg. FIG. 24 shows this period with the attitude angles and the misalignment during the period. The misalignment angle during the trajectory was near 95 degrees. As noted in the previous trajectories, in few epochs the misalignment can bring instantaneous values erroneous by 180 degrees because the disambiguity method did take the wrong decision at these epochs.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

The embodiments in which an exclusive property or privilege is claimed are defined as follows:

1. A method for enhancing a navigation solution of a device and a pedestrian by determining misalignment between the device and the pedestrian, wherein the misalignment is a heading misalignment angle between a heading of the device and a heading of the pedestrian, wherein the heading of the pedestrian is a pedestrian direction of motion, wherein the device comprises a tri-axial accelerometer and at least one processor, and wherein the method is operable when the device is associated with the pedestrian in a constrained manner and when the device is associated with the pedestrian in an unconstrained manner, such that the device is tiltable to any orientation, the method comprising using the at least one processor to perform the steps of:
    a) calculating a plurality of levelled accelerometer readings from readings of the tri-axial accelerometer by transforming the tri-axial accelerometer readings into a levelled vertical accelerometer reading component and first and second horizontal acceleration components;
    b) generating a vertical acceleration component from the levelled vertical accelerometer reading component;
    c) calculating an along-track angle based at least in part on the first and second horizontal acceleration components, wherein the along-track angle is one of a forward or a backward direction of the heading misalignment angle;
    d) determining a use case of the device based at least in part on the levelled acceleration components, wherein the use case of the device represents how the device is associated with the pedestrian;
    e) detecting if a 180 degrees error in the calculated along-track angle is present based on the determined use case, wherein one or more techniques for detecting if the 180 degrees error is present are selected from multiple techniques based on the use case; and
    f) calculating a misalignment angle from the along-track angle and, if present, the 180 degrees error.

2. The method of claim 1, wherein calculating an along-track angle comprises applying a maximum possible variance technique on the first and second horizontal acceleration components.

3. The method of claim 1, wherein calculating an along-track angle comprises the steps of:
    a) applying a Principal Component Analysis on the first and second horizontal acceleration components;
    b) calculating an along-track angle using outputs of the Principal Component Analysis; and
    c) transforming the horizontal acceleration components using the along-track angle to generate an along-track acceleration component and a cross-track acceleration component;
    wherein step e) of claim 1 further comprises detecting if the 180 degrees error in the along-track angle is present based on the use case, the along-track acceleration component and the vertical acceleration component.

4. The method of claim 1, wherein calculating an along-track angle comprises the steps of:
    a) applying a Principal Component Analysis on the first and second horizontal acceleration components;
    b) calculating an along-track angle using outputs of the Principal Component Analysis; and
    c) transforming the horizontal acceleration components using the along-track angle to generate an along-track acceleration component and a cross-track acceleration component;
    wherein step e) of claim 1 further comprises detecting if the 180 degrees error in the along-track angle is present based on the use case, the along-track acceleration component and the vertical acceleration component, or declaring no decision; and
    wherein step f) of claim 1 further comprises calculating the misalignment angle, in case e) does not declare no decision, from the along-track angle and, if present, the 180 degrees error.

5. The method of claim 3, wherein the detection if a 180 degrees error is present in the along-track angle is further based on one or more of the following components selected from: the cross-track acceleration component, the magnitude of the first and second horizontal acceleration components, or the magnitude of the first and second horizontal and the vertical acceleration components.

6. The method of claim 4, wherein if the method declares no decision, then further using buffered information to calculate the misalignment angle.

7. The method of claim 4, wherein the detection if a 180 degrees error is present in the along-track angle is further based on one or more of the following components selected from: the cross-track acceleration component, the magnitude of the first and second horizontal acceleration components, or the magnitude of the first and second horizontal and the vertical acceleration components.

8. A device portable by a pedestrian for enhancing a navigation solution of a device and a pedestrian by determining misalignment between the device and the pedestrian, wherein the misalignment is a heading misalignment angle between a heading of the device and a heading of the pedestrian and wherein the heading of the pedestrian is a pedestrian direction of motion, the device comprising:

a) a tri-axial accelerometer; and
b) a processor, coupled to receive readings from the tri-axial accelerometer, and operative to determine the misalignment between the device and the pedestrian and wherein the processor is operable when the device is associated with the pedestrian in a constrained manner and when the device is associated with the pedestrian in an unconstrained manner, such that the device is tiltable to any orientation, wherein the processor is operative to:
  i) calculate a plurality of levelled accelerometer readings from readings of the tri-axial accelerometer by transforming the tri-axial accelerometer readings into a levelled vertical accelerometer reading component and first and second horizontal acceleration components;
  ii) generate a vertical acceleration component from the levelled vertical accelerometer reading component;
  iii) calculate an along-track angle based at least in part on the first and second horizontal acceleration components, wherein the along-track angle is one of a forward or a backward direction of the heading misalignment angle;
  iv) determine a use case of the device based at least in part on the levelled acceleration components, wherein the use case of the device represents how the device is associated with the pedestrian;
  v) determine if a 180 degrees error in the calculated along-track angle is present based on the determined use case, wherein one or more techniques for determining if the 180 degrees error is present are selected from multiple techniques based on the use case; and
  vi) calculate a misalignment angle from the along-track angle and, if present, the 180 degrees error.

9. The device of claim 8, wherein the processor is operative to calculate an along-track angle by applying a maximum possible variance technique on the first and second acceleration components.

10. The method of any one of claim 2, 3, 4, 5, 6, or 7, wherein the method further comprises at least one of: i) enhancing the misalignment angle using self-contained information; ii) enhancing the calculated misalignment angle from absolute navigational information; and iii) calculating a standard deviation for the calculated misalignment angle.

* * * * *